United States Patent
Tanimoto

(10) Patent No.: US 7,948,970 B2
(45) Date of Patent: May 24, 2011

(54) COMMUNICATION TERMINAL DEVICE, COMMUNICATION METHOD AND ELECTRONIC MAIL SERVER

(75) Inventor: Yoshifumi Tanimoto, Hirakata (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 364 days.

(21) Appl. No.: 12/081,436

(22) Filed: Apr. 16, 2008

(65) Prior Publication Data

US 2008/0200115 A1 Aug. 21, 2008

Related U.S. Application Data

(62) Division of application No. 10/713,158, filed on Nov. 17, 2003, now Pat. No. 7,480,287.

(30) Foreign Application Priority Data

| Nov. 19, 2002 | (JP) | 2002-335155 |
| Jan. 15, 2003 | (JP) | 2003-007031 |
| Jan. 21, 2003 | (JP) | 2003-011795 |

(51) Int. Cl.
*H04L 12/66* (2006.01)

(52) U.S. Cl. ........ 370/352; 370/392; 709/206; 709/230; 379/219

(58) Field of Classification Search .......... 370/352, 370/342, 392, 401; 709/209, 230; 379/219
See application file for complete search history.

(56) References Cited

U.S. PATENT DOCUMENTS

| 5,938,735 | A | * | 8/1999 | Malik | 709/238 |
| 6,185,288 | B1 | * | 2/2001 | Wong | 379/219 |
| 6,393,015 | B1 | * | 5/2002 | Shtivelman | 370/352 |
| 6,515,757 | B1 | * | 2/2003 | Matsuo et al. | 358/1.15 |
| 6,600,735 | B1 | * | 7/2003 | Iwama et al. | 370/352 |
| 6,853,636 | B1 | * | 2/2005 | Merchant | 370/352 |
| 6,888,803 | B1 | * | 5/2005 | Gentry et al. | 370/259 |
| 7,113,582 | B1 | * | 9/2006 | Mangal | 379/220.01 |
| 7,333,472 | B2 | * | 2/2008 | Yang et al. | 370/352 |
| 7,440,456 | B2 | * | 10/2008 | Furukawa et al. | 370/392 |

(Continued)

FOREIGN PATENT DOCUMENTS

JP 10-065866 A 3/1998

(Continued)

OTHER PUBLICATIONS

Notification of Reason(s) for Refusal dated Dec. 27, 2005, issued in corresponding Patent Application No. 2003-007031.
Notification of Reason(s) for Refusal dated Dec. 13, 2005, issued in corresponding Patent Application No. 2002-335155.

(Continued)

*Primary Examiner* — Brian D Nguyen
*Assistant Examiner* — Emmanuel Maglo
(74) *Attorney, Agent, or Firm* — Westerman, Hattori, Daniels & Adrian, LLP

(57) ABSTRACT

A communication terminal device includes a connection establishing unit which establishes a connection by a call control protocol with a destination device designated by an IP telephone number, a communication protocol requesting unit which request a presentation of a plurality of communication protocols which can be supported by the destination device over the connection, a communication protocol selecting unit which selects one communication protocol which the communication terminal device itself can support from the communication protocols presented from the destination device as a response to the request by the communication protocol requesting unit, and a communication unit which communicates with the destination device over the connection by the communication protocol selected by the communication protocol selecting unit.

10 Claims, 19 Drawing Sheets

U.S. PATENT DOCUMENTS

| | | | |
|---|---|---|---|
| 7,580,402 B2 * | 8/2009 | Masuhiro et al. | 370/352 |
| 7,583,659 B2 * | 9/2009 | Matsuhashi et al. | 370/352 |
| 2002/0107937 A1 * | 8/2002 | Iyoki | 709/217 |
| 2002/0116464 A1 * | 8/2002 | Mak | 709/206 |
| 2003/0079020 A1 * | 4/2003 | Gourraud et al. | 709/227 |
| 2005/0004991 A1 * | 1/2005 | Yokoyama | 709/206 |
| 2005/0025294 A1 * | 2/2005 | Matsuhashi et al. | 379/88.17 |
| 2005/0193123 A9 * | 9/2005 | Bach Corneliussen | 709/228 |
| 2006/0013195 A1 * | 1/2006 | Son et al. | 370/352 |
| 2008/0107094 A1 * | 5/2008 | Borella et al. | 370/342 |

FOREIGN PATENT DOCUMENTS

| | | |
|---|---|---|
| JP | 10-136112 A | 5/1998 |
| JP | 11-252341 A | 9/1999 |
| JP | 11-261628 A | 9/1999 |
| JP | 2001-078041 A | 3/2001 |
| JP | 2002-101256 A | 4/2002 |

OTHER PUBLICATIONS

Notification of Reason(s) for Refusal dated Aug. 3, 2006, issued in corresponding Patent Application No. 2002-335155.

* cited by examiner

| DESTINATION | IP TEL NO. | COMMUNICATION PROTOCOL | E-MAIL ADDRESS |
|---|---|---|---|
| ABC CO. | 050-888999 | | |
| efg CO. | 050-123456 | SMTP | efg@xxx.com |
| HIJ CO. | 050-333444 | | |
| ⋮ | ⋮ | ⋮ | ⋮ |

| SPEED DIAL NO. | DESTINATION. | IP TEL NO. | E-MAIL ADDRESS |
|---|---|---|---|
| 001 | ABC CO. | 050-888999 | ○○○@xxx.com |
| 002 | efg CO. | 050-123456 | efg@xxx.com |
| 003 | HIJ CO. |  | △△△@xxx.com |
| ⋮ | ⋮ | ⋮ | ⋮ |

| DESTINATION ADDRESS, DOMAIN | IP TEL NO. |
|---|---|
| abc@efg.com | 050-1234-5678 |
| muratec.co.jp | 050-2222-3333 |
| *.com | 080-**-1111 |

| SPECIFIC INFORMATION | IP TEL NO. |
|---|---|
| KYOTOBRANCHOFFICE | 050-1234-5678 |
| OSAKABRANCHOFFICE | 050-2222-3333 |
| TOKYOBRANCHOFFICE | 080-****-1111 |

COMMUNICATION TERMINAL DEVICE, COMMUNICATION METHOD AND ELECTRONIC MAIL SERVER

CROSS-REFERENCE TO RELATED APPLICATIONS

This application is a divisional of prior application Ser. No. 10/713,158 filed on Nov. 17, 2003, the benefit of which is claimed under 35 U.S.C. §120.

FIELD OF THE INVENTION

The present invention relates to a communication terminal device and a communication method which transmit image data, text data or the like by using an Internet Protocol (IP) network as a data transmission channel. The present invention also relates to an electronic mail server.

DESCRIPTION OF THE RELATED ART

Recently, IP telephone communication for telephoning by using an IP network and IP facsimile communication for facsimile transmission by also using the IP network have become widespread. Furthermore, a so-called multifunction peripheral is being developed, which combines a communication function using a plurality of IP networks, a conventional electronic mail communication function, and a G3 facsimile communication function or the like in one device. The communication function using a plurality of IP networks includes an IP telephone communication function and an IP facsimile communication function based on the International Telecommunication Union-Telecommunications (ITU-T) Recommendation T.38. There is a communication terminal device which can simultaneously carry out transmission and reception using IP telephone communication and IP facsimile communication.

When carrying out the IP telephone communication or the IP facsimile communication, the part that corresponds to the processing control handled by an exchanger in a general public network, such as calling the other end or managing a call, is carried out by a call control protocol. For the call control protocol, H.323 and a Session Initiation Protocol (SIP) (Request For Comments (RFC) 2543) are used widely. The SIP is a call control protocol, which just establishes, changes, and ends a session and does not concern itself with the contents of the session. Therefore, the SIP can execute various communication protocols such as a Simple Mail Transfer Protocol (SMTP) or a Hyper Text Transfer Protocol (HTTP) over a connection established between a transmitting side and a receiving side, not only IP telephone communication or IP facsimile communication. Thus, there is an advantage that the communication terminal devices of the transmitting side and the receiving side can directly exchange data in real-time by the SIP.

However, there is the following first problem: That is, even if a communication terminal device includes a transmitting unit which transmits data to a destination device by a call control protocol such as the SIP, the communication protocol which can be supported by the destination device differs according to each destination device. Therefore, it was necessary for the transmitting side to confirm with the user of the destination device in advance with a usable communication protocol, and to transmit the data by a designated communication protocol (SMTP, HTTP, etc.)

There is the following second problem: That is, for the data communication by the call control protocol with a connection established with the destination device, an IP telephone number is necessary as information for specifying the destination. Therefore, even if a facsimile number or an electronic mail address of the destination device is stored, if the IP telephone number is not known, real-time data communication cannot be carried out by the call control protocol.

There is the following third problem: That is, in the case of an electronic mail server, as shown in FIG. 19, to deliver electronic mail received from a mail client 210 or the like to an electronic mail server 216, which is to be a final destination, it is necessary to intervene several electronic mail servers 215. Therefore, since the data is not transmitted directly to the electronic mail server 216 of the final destination, the electronic mail cannot be transmitted in real-time. Thus, it could not be determined whether or not the electronic mail has been delivered to the electronic mail server of the final destination until receiving a Delivery Service Notification (DSN) or a Message Disposition Notification (MDN). In addition, there were delays in the start of various processes carried out beginning at the arrival of the electronic mail, such as the display of the transmission result of communication history information and a delivery notification to an operator.

SUMMARY OF THE INVENTION

The present invention was made in consideration of the first problem. A first object of the present invention is to provide a communication terminal device and a communication method which determines a communication protocol according to the communication protocol of the destination device just by designating the destination device by an IP telephone number, and transmits data directly to the destination device in real-time.

The present invention was also made in consideration of the second problem. A second object of the present invention is to provide a communication terminal device and a communication method which can transmit data by using a call control protocol by executing a prescribed processing operation to obtain an IP telephone number of a destination device when the IP telephone number of the destination device is unknown in a communication terminal device having both an electronic mail communication unit and a communication unit using an IP network.

The present invention was further made in consideration of the third problem. A third object of the present invention is to provide an electronic mail server and a communication method which can reliably transmit electronic mail in real-time to an electronic mail server of a final destination.

To accomplish the first object, the communication terminal device of the present invention includes a connection establishing unit which establishes a connection by a call control protocol with a destination device designated by an IP telephone number. In addition, the communication terminal device includes a communication protocol requesting unit which requests a presentation of a plurality of communication protocols (SMTP, HTTP, etc.) which can be supported by the destination device over the connection. The communication terminal device also includes a communication protocol selecting unit which selects one communication protocol, which the communication terminal device itself can support, from the communication protocols presented by the destination device. The communication protocols presented by the destination device are presented as a response to the request by the communication protocol requesting unit. The communication terminal device also includes a communication unit which communicates with the destination device over the connection by the communication protocol selected by the communication protocol selecting unit.

According to the present invention, just by designating the destination device by the IP telephone number, data such as image data can be transmitted directly to the destination device in real-time using the communication protocol of the destination device.

The communication terminal device of the present invention further includes a storage unit which stores a communication protocol and an IP telephone number by associating one with the other. When a communication protocol is stored in the storage unit by being associated with the IP telephone number of the destination device, the communication protocol requesting unit does not request a presentation of a plurality of communication protocols which the destination device can support over the connection. The communication protocol selecting unit selects the communication protocol associated with the IP telephone number of the destination device and stored by the storage unit.

According to the present invention, when the IP telephone number of the destination device and the communication protocol are stored in the storage unit, the registered communication protocol is adopted for the communication protocol to be exchanged with the destination on the call controlled connection established with the destination device. Therefore, when a connection is established, the communication can be started immediately by the communication protocol which can be supported by the destination device. Thus, the communication can be carried out efficiently.

When the communication protocol is not stored in the storage unit by being associated with the IP telephone number of the destination device, the communication protocol requesting unit requests a presentation of a plurality of communication protocols which can be supported by the destination device over the connection. Then, the communication protocol selecting unit selects one communication protocol, which the communication terminal device itself can support, from the communication protocols presented from the destination device.

According to the present invention, optimum processing is carried out regardless of whether or not the IP telephone number of the destination device and the communication protocol are stored in the storage unit.

The communication terminal device of the present invention includes an output unit for outputting to a prescribed output destination, information indicating a failure in the communication with the destination device when the communication protocol selecting unit fails to select the communication protocol.

According to the present invention, an operator can easily recognize a communication failure when communication fails to be carried out with the destination device.

When the communication protocol is not stored in the storage unit by being associated with the IP telephone number of the destination device, the storage unit stores the communication protocol, which is selected by the communication protocol selecting unit from the communication protocols presented by the destination device, by its association with the IP telephone number of the destination device.

According to the present invention, even when the IP telephone number of the destination device and the communication protocol are not registered in the storage unit, by carrying out communication once, the communication protocol of the destination device is registered automatically, and the registered communication protocol is used for communication the next time. Therefore, the repeated work of registering by the operator can be eliminated, and the operation can be simplified.

In addition, the communication terminal device of the present invention includes a storage unit which stores the communication protocol and the IP telephone number by associating one with the other, and an operation unit to be operated by an operator. The stored contents of the storage unit can be edited, added, or deleted freely by a prescribed operation from the operation unit.

According to the present invention, the operator can freely edit, add, or delete the contents registered in the storage unit.

To accomplish the second object, the communication terminal device of the present invention includes a connection establishing unit which establishes a connection by a call control protocol with a destination device designated by an IP telephone number. The communication terminal device also includes a transmitting unit which transmits electronic mail to the destination device over the connection, and a determining unit which determines whether or not a connection has been established by the connection establishing unit. In addition, the communication terminal device includes a decision unit which decides which processing is to be executed in accordance with the determination result of the determining unit.

According to the present invention, subsequent processing is decided after it is determined whether or not the connection by the call control protocol can be established. Therefore, even when an IP telephone call is made to a destination which does not support a prescribed call control protocol, the appropriate processing can be carried out.

The communication terminal device also includes a transmitting unit which transmits the electronic mail to a prescribed electronic mail address when the determining unit determines that a connection failed to be established.

According to the present invention, even when a connection cannot be established by a prescribed call control protocol with the destination device designated by the IP telephone number, data such as image data can be transmitted by normal electronic mail transmission.

The communication terminal device of the present invention also includes a storage unit which stores the IP telephone number and the electronic mail address by associating one with the other. The prescribed electronic mail address is an electronic mail address stored in the storage unit by being associated with the IP telephone number of the destination device.

According to the present invention, even when a connection cannot be established by a prescribed call control protocol with the destination device designated by the IP telephone number, the data such as image data can be transmitted automatically to the electronic mail address stored in the storage unit by normal electronic mail transmission. Therefore, there is an advantage that a user is not required to confirm whether or not the IP telephone communication with the destination device succeeded.

The communication terminal device of the present invention also includes an IP telephone number transmitting unit which transmits an IP telephone number of the communication terminal device by including the IP telephone number in the transmission process of the electronic mail.

According to the present invention, it is possible to notify the destination device of the IP telephone number of the communication terminal device.

The communication terminal device also includes a first connection establishing unit which establishes a connection with a transmitter device that is calling the communication terminal device, and a receiving unit which receives electronic mail transmitted from the transmitter device over the connection.

According to the present invention, the communication terminal device can receive electronic mail in real-time directly from the transmitter device that is calling the communication terminal device.

The communication terminal device of the present invention also includes a second connection establishing unit which establishes a connection by a call control protocol with a destination device designated by the IP telephone number, and an IP telephone number extracting unit which extracts an IP telephone number from the electronic mail received by the receiving unit. The second connection establishing unit establishes a connection with the transmitter device designated by the IP telephone number extracted by the IP telephone number extracting unit, and transmits reception confirmation via electric mail to the transmitter device over the connection for the electronic mail received by the receiving unit.

According to the present invention, with the communication terminal device as the transmitter, a full mode Internet facsimile communication can be realized using an IP telephone communication.

The communication terminal device of the present invention also includes an IP telephone number extracting unit which extracts an IP telephone number from the electronic mail received by the receiving unit, and a storage unit which stores the IP telephone number extracted by the IP telephone number extracting unit.

According to the present invention, when the IP telephone number of the transmitter device is included in the received electronic mail, electronic mail can be transmitted to the transmitter device by using IP telephone communication.

To accomplish the third object, the electronic mail server of the present invention includes a connection establishing unit which establishes a connection by a call control protocol with a destination device designated by an IP telephone number. The electronic mail server also includes a transmitting unit which designates the destination device by the IP telephone number and establishes the connection when receiving electronic mail to be forwarded, and transmits the received electronic mail on the established connection.

According to the present invention, when the destination electronic mail address of the received electronic mail is an electronic mail address of an electronic mail server having a communication function that uses a call control protocol, the electronic mail can be transmitted directly in real-time. Therefore, the communication result can be obtained at the same time as the transmission of the electronic mail.

The IP telephone number is included in the received electronic mail.

According to the present invention, by indicating the IP telephone number of the destination in the electronic mail, the receiving side of the electronic mail can forward the electronic mail to the electronic mail server promptly and reliably by using the call control protocol.

The electronic mail server of the present invention also includes a storage unit which stores the electronic mail address and the telephone number by associating one with the other. When the electronic mail address stored in the storage unit corresponds with the destination electronic mail address of the received electronic mail, the telephone number stored by being associated with the electronic mail address is used as the IP telephone number.

According to the present invention, by storing the electronic mail address and the IP telephone number by associating one with the other, the electronic mail can be forwarded (transmitted) automatically by using the call control protocol.

The IP telephone number is decided in accordance with specific information included in the communication information of the received electronic mail or the electronic mail information.

According to the present invention, the IP telephone number is decided in accordance with the communication information at the destination or the information included in the electronic mail. Therefore, by describing specific information in the destination electronic mail address or the electronic mail, the transmitter of the electronic mail can forward the electronic mail to the electronic mail server promptly and reliably by using the call control protocol.

BRIEF DESCRIPTION OF THE DRAWINGS

FIG. 2 shows an example of an IP telephone number table.

FIG. 6 shows an example of a table.

FIGS. 15A and 15B show an example of tables.

FIGS. 16A and 16B show transmission channels of electronic mail.

DETAILED DESCRIPTION OF THE PREFERRED EMBODIMENTS

First Embodiment

Figure 1:
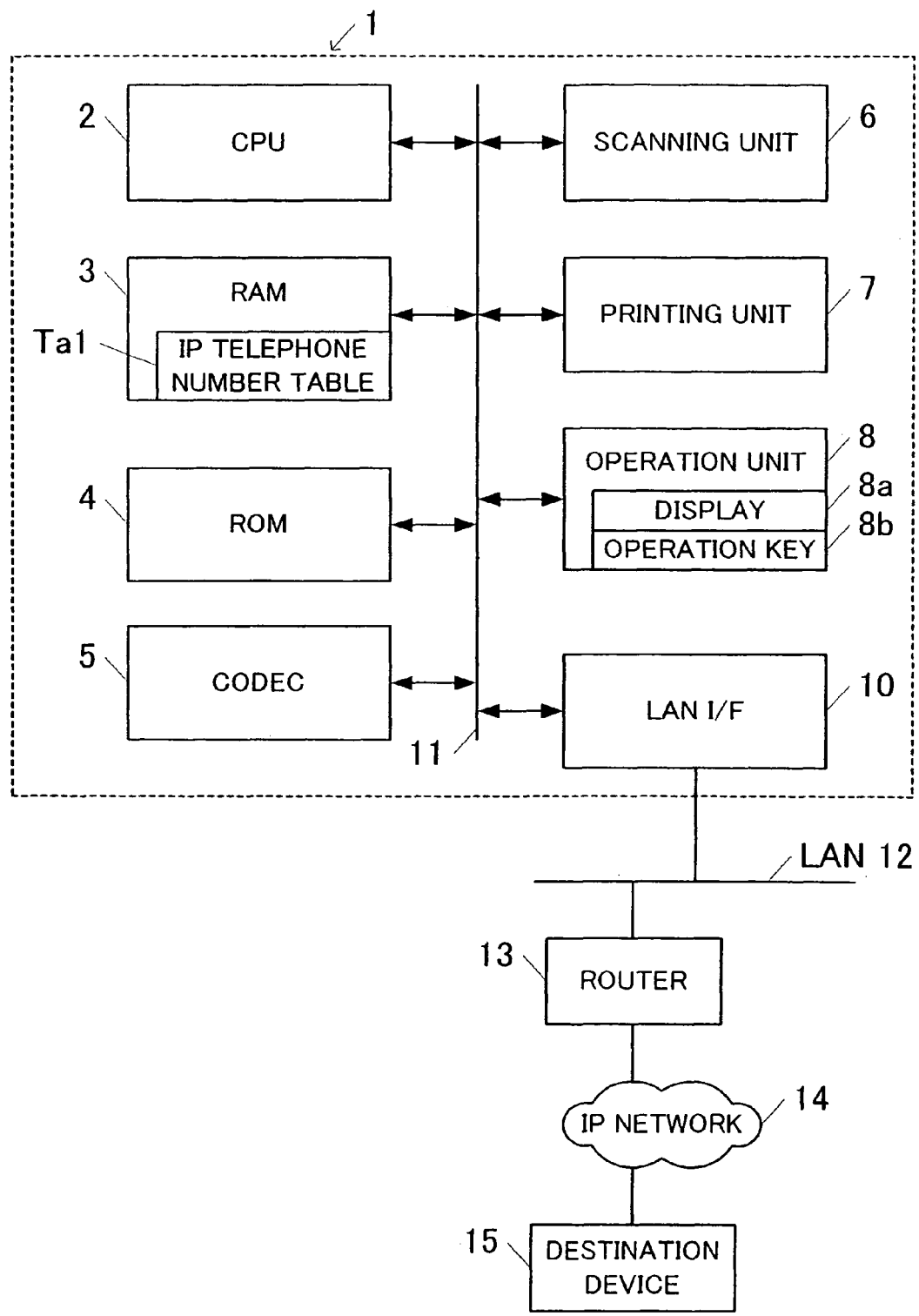
FIG. 1 is a block diagram showing an example of a configuration of a communication terminal device and an example of a configuration of a network provided with the communication terminal device according to a first embodiment of the present invention.

Referring to FIGS. 1 through 4, a facsimile machine which carries out the communication of image data, electronic mail data or the like through an IP network will be described as an example of a communication terminal device of the present invention for accomplishing the first object. FIG. 1 shows an example of a configuration of a facsimile machine 1. The facsimile machine 1 includes a Central Processing Unit (CPU) 2, a Random Access Memory (RAM) 3, a Read Only Memory (ROM) 4, a codec 5, a scanning unit 6, a printing unit 7, an operation unit 8, and a Local Area Network (LAN) interface 10. Each of the parts 2 through 10 is connected by a bus 11 in a manner in which communication can be carried out.

The CPU 2 controls each of the parts of the facsimile machine 1 in accordance with a prescribed program. The RAM 3 functions as a storage unit which stores image data, various configuration information, an IP telephone number table Ta1 to be described later, or the like. The RAM 3 also functions as a storage unit for various data stored temporarily. The ROM 4 stores various programs for the CPU 2 to control the operation of each of the parts of the facsimile machine 1.

As shown in FIG. 2, the IP telephone number table Ta1 includes a "DESTINATION" column for registering a name of a destination, an "IP TEL NO." column for registering an IP telephone number of the destination (telephone number assigned for an IP telephone), and a "COMMUNICATION PROTOCOL" column for registering a communication protocol which can be supported by a destination device of the IP telephone number and the facsimile machine 1 itself. Various pieces of information are associated with one another and stored by being registered in a same record. For example, the name of the destination "efg CO." registered in the "DESTINATION" column, the IP telephone number "050-123456" registered in the "IP TEL NO." column, and the communication protocol "SMTP" are associated with one another and stored in the IP telephone number table Ta1. Further, the information of the IP telephone number table Ta1 can be edited, added, or deleted freely by a prescribed operation from the operation unit 8 by an operator with the information displayed on a display of the operation unit 8 or the like.

The codec 5 encodes and decodes according to a format of the communication protocol to be used. For example, the codec 5 encodes and decodes image data in accordance with a Tagged Image File Format (TIFF), which is an image format attached to an electronic mail transmitted and received by a Simple Mail Transfer Protocol (SMTP).

The scanning unit 6 scans image data of an original document, and forms image data binarized in black and white. The printing unit 7 uses an electro-photographic method or the like, and prints the received image data or the like onto a recording paper.

The operation unit 8 includes a display 8a, an operation key 8b or the like, and various operations are carried out from the operation unit 8 by the operator. Further, the display 8a displays information relating to a status of the facsimile machine 1, various screens or the like. The operation key 8b is used for inputting various information such as an IP telephone number and an electronic mail address.

The LAN interface 10 is an interface for the LAN 12, and connects the facsimile machine 1 to the LAN 12 such that a communication can be carried out. A router 13 is provided to the LAN 12. The facsimile machine 1 can carry out data communication in real-time directly with a destination device 15 in an IP network 14 or the like through the router 13 by using a call control protocol to be described later.

The facsimile machine 1 includes a User Datagram Protocol/Internet Protocol (UDP/IP) and a SIP. The facsimile machine 1 also includes a function for transmitting image data or text data to the destination device 15 by directly executing on the destination device, various communication protocols (specifically, the communication protocol such as the SMTP or the HTTP) with a connection by the SIP (hereinafter referred to as the "SIP connection") established with the destination device 15 designated by the IP telephone number.

Figure 3:
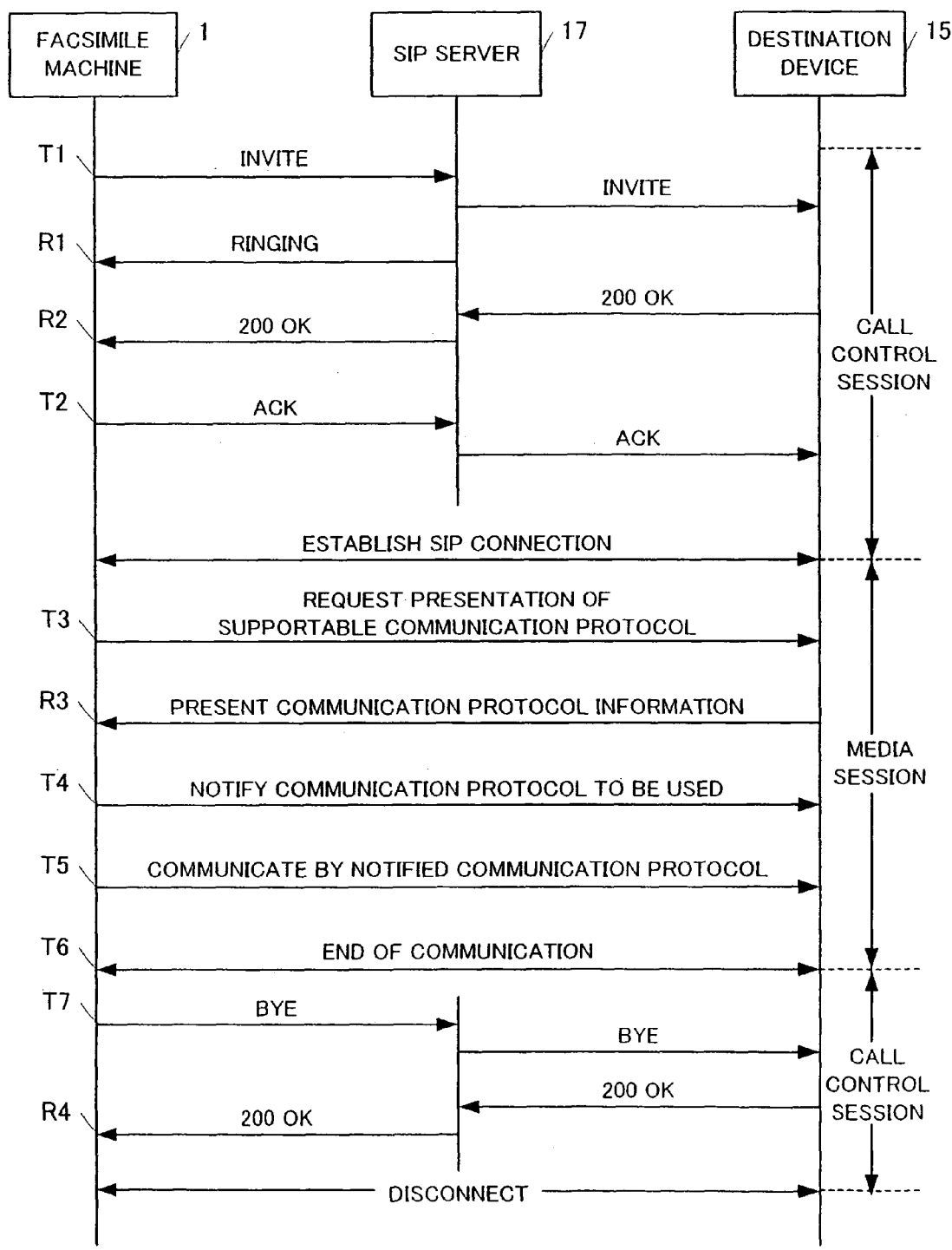
FIG. 3 is a sequence diagram showing an example of a session for carrying out a communication with a destination device by a Session Initiation Protocol (SIP) (call control protocol).

As shown in FIG. 3, the facsimile machine 1 designates by the IP telephone number, the destination device 15 also having the UDP/IP, the SIP, the SMTP, the HTTP or the like. The facsimile machine 1 forms a call control session, and establishes an SIP connection. Then, after forming a media session as shown in the drawing describing the SIP connection, the facsimile machine 1 forms a call control session for discontinuing the communication.

That is, when a prescribed transmission operation is carried out at the facsimile machine 1, for example, when an IP telephone number is input from the operation unit 8 by the operator, the facsimile machine 1 requests the SIP server 17 to make a call to a destination by the "INVITE" operation that designates the IP telephone number (T1). The SIP server 17 that received the request inquires as to an IP address of the IP telephone number designated by the facsimile machine 1 to a location server (not shown) having information for associating the IP telephone number and the IP address. The SIP server 17 obtains the IP address, and makes a call by transmitting "INVITE" to the destination device 15 designated by the IP address. At this time, a signal which indicates that the destination device 15 is being called, "RINGING", is transmitted from the SIP server 17 to the facsimile machine 1 (R1).

When the destination device 15 called by the SIP server 17 responds to the call, the destination device 15 transmits a success response code "200 OK" to the SIP server 17, and the SIP server 17 that received the success response code "200 OK" transmits the success response code "200 OK" to the facsimile machine 1 (R2). The facsimile machine 1 transmits to the SIP server 17, "ACK" which indicates that the success response code has been received (T2). The SIP server 17 that received "ACK" also transmits "ACK" to the destination device 15, and an SIP connection is established between the facsimile machine 1 and the destination device 15 to form a communication status that enables various communication protocols.

Before executing the communication protocol between the facsimile machine 1 and the destination device 15 through the established SIP connection, when necessary (which will be described in details later), the facsimile machine 1 transmits to the destination device 15, a prescribed command for requesting the destination device 15 to present a supportable communication protocol (T3). In response to this, the destination device 15 executes a processing operation to present the facsimile machine 1 with information of the communication protocol which can be supported by the destination device 15 itself (R3). Moreover, before executing the communication protocol, the facsimile machine 1 notifies the destination device 15 in advance with the communication protocol to be used (T4). After indicating the destination device 15 to be prepared for reception, the notified communication protocol is executed between the facsimile machine 1 and the destination device 15, and image data or the like of the original document is transmitted (T5).

After completing the communication protocol (T6), the facsimile machine 1 transmits to the SIP server 17, "BYE" which requests disconnection of the SIP connection (T7). The SIP server 17 that received "BYE" transmits "BYE" to the destination device 15. Then, when the SIP server 17 receives the success response code "200 OK" from the destination device 15, the SIP server 17 also transmits the success response code "200 OK" to the facsimile machine 1 (R4), and the series of the session is ended (the communication is disconnected).

Figure 4:
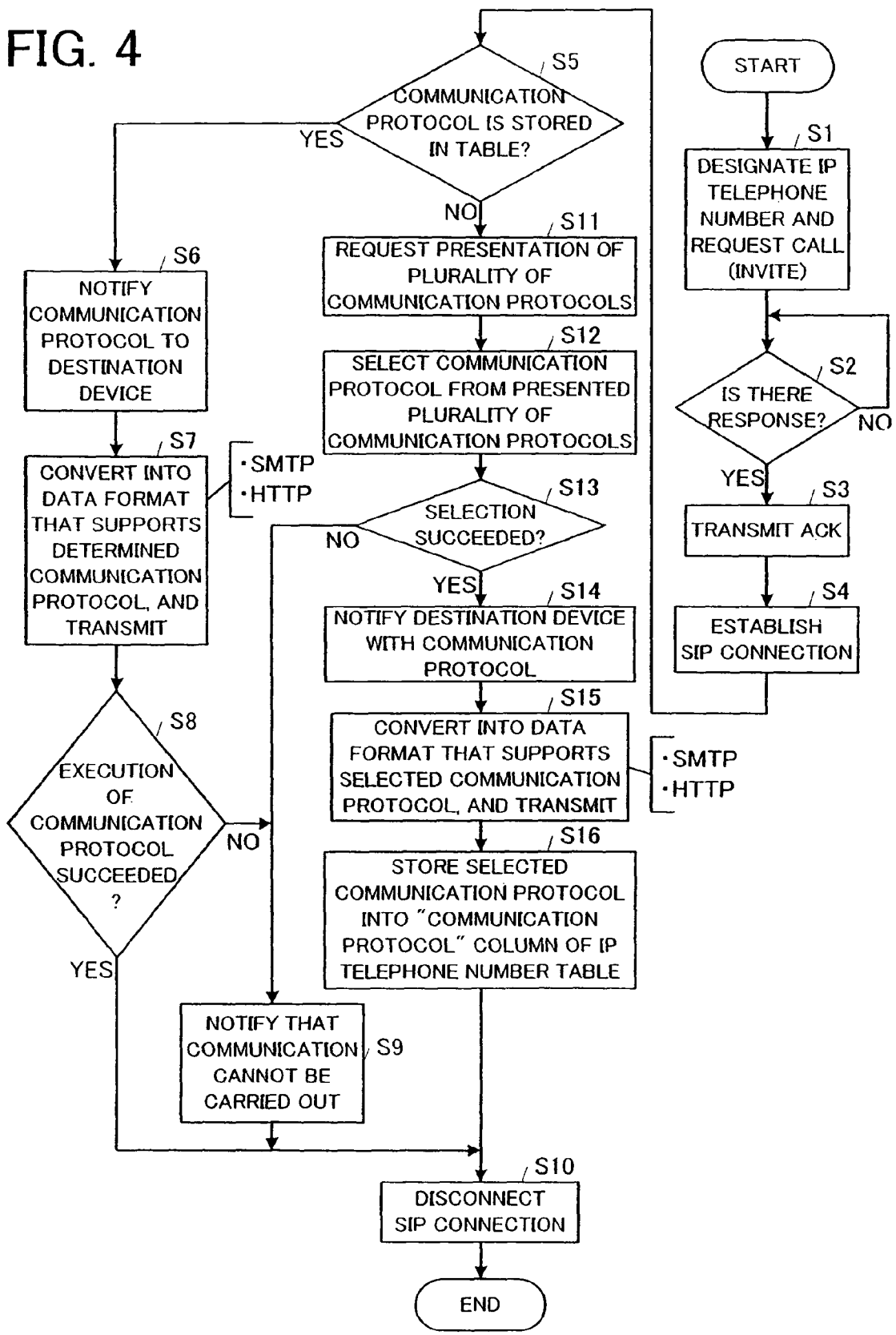
FIG. 4 is a flowchart showing a processing operation for executing a data communication by designating the destination device by an IP telephone number in a communication terminal device according to the first embodiment of the present invention.

To form the above-described session, the facsimile machine 1 executes a processing operation in accordance with the flowchart of FIG. 4. The details of the processing operation will be described below. Further, the operation of the facsimile machine 1 to be described with reference to the flowchart is carried out by following a command generated by the CPU 2 in accordance with the control program stored in the ROM 4.

When a prescribed transmission operation is carried out by an operator and a start key is pressed as a transmission starting command, the facsimile machine 1 designates a destination device by an IP telephone number and requests the SIP server 17 to call the destination device by "INVITE" (S1, T1). For example, the prescribed transmission operation includes setting of an original document to the scanning unit 6, and inputting of an IP telephone number from the operation unit 8.

Next, when the facsimile machine 1 receives the success response code "200 OK" from the SIP server 17 (S2, R2), the facsimile machine 1 transmits to the SIP server 17, "ACK" indicating the reception of the success response code for "INVITE", to establish a connection with the destination device 15 (S3, T2). Then, an SIP connection is established between the facsimile machine 1 and the destination device 15 by the SIP server 17 (S4).

After the SIP connection is established, the facsimile machine 1 determines whether or not the IP telephone number of the destination device 15 designated at the call is registered in the "IP TEL NO." column of the IP telephone number table Ta1 formed in the RAM 3, and whether or not a communication protocol is registered (stored) in the "COMMUNICATION PROTOCOL" column by being associated with the IP telephone number (S5).

When it is determined that the associated communication protocol is registered, the request for a presentation of the communication protocol in T3 is not carried out. The communication protocol registered in the "COMMUNICATION PROTOCOL" column is selected as an applicable communication protocol, and the facsimile machine 1 notifies the destination device 15 of the fact that a communication will be started by the selected communication protocol (S6, T4). Then, the transmission data is converted into a format that supports the selected communication protocol, and the converted data is transmitted to the destination device 15 by the communication protocol (SMTP, HTTP, etc.) (S7, T5).

When there is a mistake in the IP telephone number or the communication protocol registered in the IP telephone number table Ta1 or when a wrong number is dialed, and the destination device 15 fails to support the communication protocol decided in accordance with the IP telephone number table Ta1 and the execution of the communication protocol fails (S8: NO), the failure in the communication is notified (S9). Then, the facsimile machine 1 transmits "BYE" to the SIP server 17, and the SIP connection established between the facsimile machine 1 and the destination device 15 is disconnected (S10, T7). Further, information such as "Transmission of image failed" and "Transmission of e-mail failed" can be stored in a prescribed area of the RAM 3, and the notification of the failure in the communication can be carried out by outputting the information to the display 9a or the printing unit 7 as the processing operation of step S9. Moreover, instead of displaying the information, a prescribed buzzer sound can be activated.

When the execution of the communication protocol succeeds (S8: YES), the processing operation of S10 is executed. In other words, the SIP connection is disconnected.

Meanwhile, in S5, when it is determined that the IP telephone number of the destination device 15 is not registered in the "IP TEL NO." column of the IP telephone number table Ta1, or when it is determined that although the IP telephone number of the destination device 15 is registered, the communication protocol associated with the IP telephone number is not registered in the "COMMUNICATION PROTOCOL" column (S5: NO), the facsimile machine 1 transmits to the destination device 15, a prescribed command for requesting a presentation of a plurality of communication protocols which can be supported by the destination device 15 (S11, T3). When the destination device 15 presents a plurality of supportable communication protocols as a response to the request by the prescribed command, and the facsimile machine 1 succeeds in selecting one communication protocol, which can be supported by the facsimile machine 1, from the presented communication protocols (S12, S13, R3), the facsimile machine 1 notifies the destination device 15 with the fact that a communication will be started by the selected communication protocol (S14, T4). The transmission data is converted into a format according to the communication protocol, and the converted data is transmitted to the destination device 15 through the SIP connection by the communication protocol (SMTP, HTTP, etc.) (S15).

Next, the communication protocol selected in S12 is registered into the "COMMUNICATION PROTOCOL" column in a record that is the same as that of the IP telephone number of the destination device 15 registered in the "IP TEL NO." column of the IP telephone number table Ta1, and the selected communication protocol and the IP telephone number are stored by being associated with one another. When the IP telephone number of the destination device 15 is not registered in the "IP TEL NO." column, a new record is formed in the IP telephone number table Ta1. The IP telephone number is registered into the "IP TEL NO." column of the new record and the selected communication protocol is registered into the "COMMUNICATION PROTOCOL" column of the new record, and the IP telephone number and the selected communication protocol are stored by being associated with one another (S16). Then, the process proceeds to S10, and the SIP connection is disconnected (S10).

Meanwhile, when a communication protocol is not presented from the destination device 15 and a communication protocol fails to be selected (S13: NO), the process proceeds to S9 to notify that the communication failed to be carried out with the destination device 15.

As described above, according to the facsimile machine 1 of the first embodiment, when the IP telephone number of the destination device 15 and the communication protocol are registered in the IP telephone number table Ta1, the registered communication protocol is adopted for the communication protocol to be exchanged with the destination device 15 through the SIP connection established between the facsimile machine 1 and the destination device 15. Therefore, at the time an SIP connection is established, the communication can be started immediately by the communication protocol which can be supported by the destination device 15. Thus, the communication can be carried out efficiently.

Moreover, even when the communication protocol which can be supported by the destination device 15 is not registered, since the communication protocol which can be supported by the destination device 15 presented from the destination device 15 is registered in the IP telephone number table Ta1, the communication protocol registered in the IP telephone number table Ta1 is used for transmitting data to the destination device 15. Thus, the communication can be carried out efficiently as described above. Furthermore, the IP telephone number table Ta1 stores the communication protocol information of the destination device 15, to which a data communication has been carried out for at least once, by associating with the IP telephone number. Therefore, there is the advantage that the communication protocol information of the destination device 15 can be managed by an IP telephone number. For example, by outputting the contents of the IP telephone number table Ta1 to the display 8a or the like, a confirmation can be carried out easily regarding the communication protocol, which can be supported by the destination device 15, displayed by being associated with the IP telephone number (FIG. 2 shows an example of the display).

Further, in the first embodiment, the SIP is used for the call control protocol, but of course, protocols other than the SIP that is similar to the SIP can be used for the call control protocol.

Second Embodiment

Figure 5:
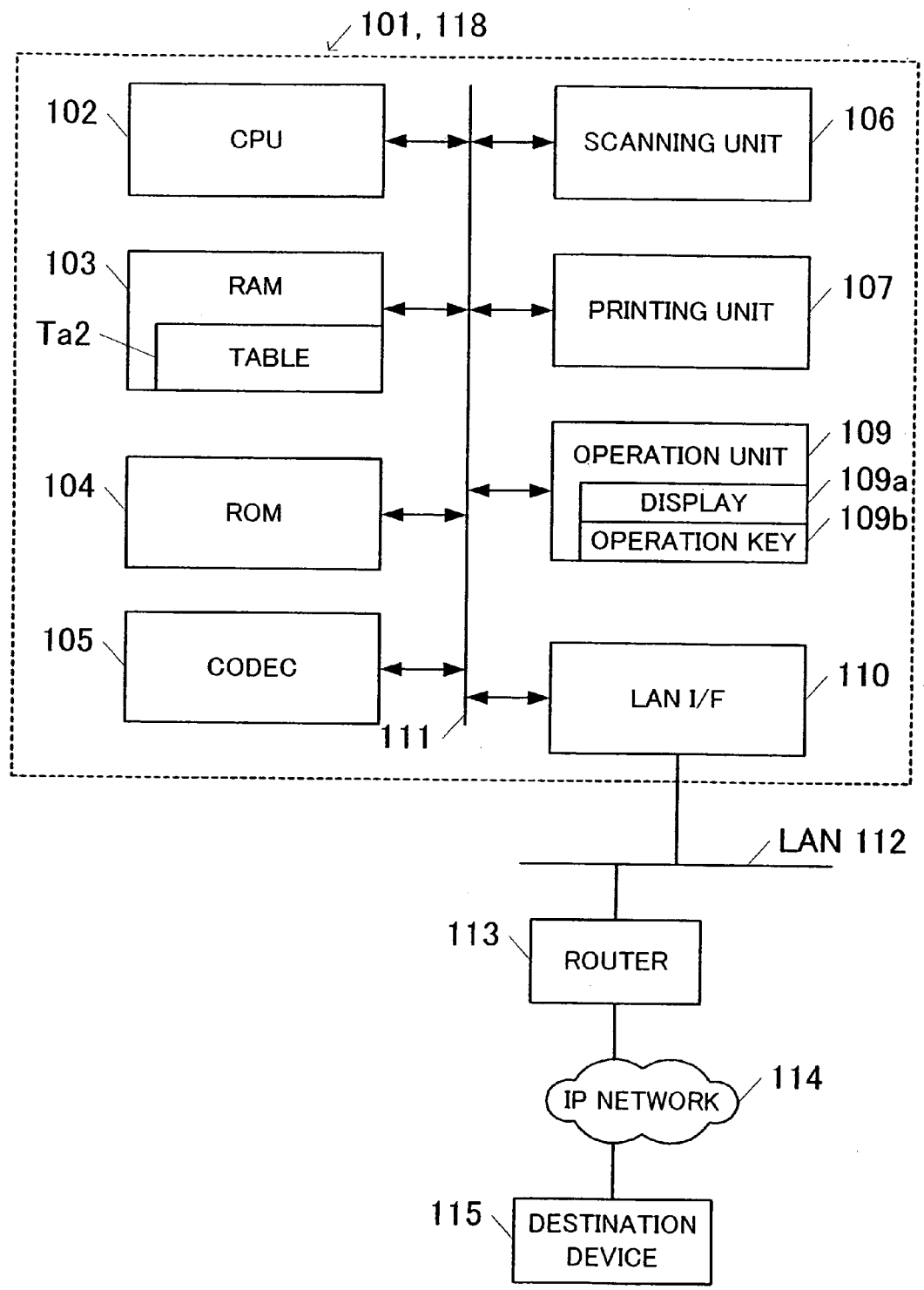
FIG. 5 is a block diagram showing an example of a configuration of an Internet facsimile machine (communication terminal device) according to a second and a third embodiments of the present invention.

Next, referring to FIGS. 5 through 13, an Internet facsimile machine, which transmits an electronic mail through an IP network, will be described as a communication terminal device of the present invention and as an example of the communication terminal device for achieving the second object of the present invention. Further, for the convenience of description, the Internet facsimile machine to be a transmitting side will be referred to as the "transmitter Internet facsimile machine", and the Internet facsimile machine to be a receiving side will be referred to as the "recipient Internet facsimile machine". FIG. 5 shows an example of a configuration of the Internet facsimile machine 101. That is, the Internet facsimile machines 101, 101A include a CPU 102, a RAM 103, a ROM 104, a codec 105, a scanning unit 106, a printing unit 107, an operation unit 109, and a LAN interface 110. Each of the parts 102 through 110 is connected by a bus 111 in a manner that communication can be carried out.

The CPU 102 controls each of the parts of the Internet facsimile machine 101 in accordance with a prescribed program. The RAM 103 functions as a storage unit which stores image data, various configuration information, a table Ta2 to be described later, or the like. The RAM 103 also functions as a storage unit for various data stored temporarily. The ROM 104 stores various programs for controlling the operation of each of the parts of the Internet facsimile machine 101 by the CPU 102.

As shown in FIG. 6, the table Ta2 includes a "SPEED DIAL NO." column for registering a speed-dial number that is designated when using a speed-dial function, a "DESTINATION" column for registering a name of a destination, an "IP TEL NO." column for registering an IP telephone number of a destination device, and an "E-MAIL ADDRESS" column for registering an electronic mail address of the destination device. The pieces of information registered in the same record are stored by being associated with one another. For example, the pieces of information which are registered in the same record, a speed dial number "002", a name of a destination "efg CO.", an IP telephone number "050-123456", and an electronic mail address "efg@xxx.com", are associated with one another and stored in the table Ta2. Further, the information of the table Ta2 can be edited, added, or deleted freely by a prescribed operation from the operation unit 109 by an operator.

The codec 105 encodes and decodes by a format according to the communication protocol to be used. For example, the codec 105 encodes and decodes image data according to the TIFF which is an image format attached to an electronic mail transmitted and received by the SMTP.

The scanning unit 106 scans image data of an original document, and forms image data binarized in black and white. The printing unit 107 uses an electro-photographic method or the like, and prints the received image data or the like onto a recording paper.

The display unit 109 includes a display 109a, an operation key 109b or the like, and the operator carries out various operations from the operation unit 109. The display unit 109a displays information relating to the status of the Internet facsimile machines 101 and 101A, and various screens or the like. The operation key 109b is used for inputting various pieces of information such as an IP telephone number and an electronic mail address.

The LAN interface 110 is an interface for a LAN 112, and connects the Internet facsimile machine 101 to the LAN 112 in a manner that communication can be carried out. A router 113 is provided to the LAN 112, and the Internet facsimile machine 101 can carry out data communication in real-time directly with the destination device 115 in an IP network 114 through the router 113 by using a call control protocol to be described later.

The Internet facsimile machine 101 includes a UDP/IP and an SIP, and a function for carrying out an SMTP transmission of an electronic mail by establishing an SIP connection with a destination device designated by the IP telephone number (recipient Internet facsimile machine 101B). The Internet facsimile machine 101 also includes a general electronic mail transmitting and receiving function. That is, electronic mail is not exchanged directly with the destination by executing the SMTP with an SIP connection established, but electronic mail is transmitted and received indirectly with the destination via an electronic mail forwarding process between each of SMTP servers.

Figure 7:
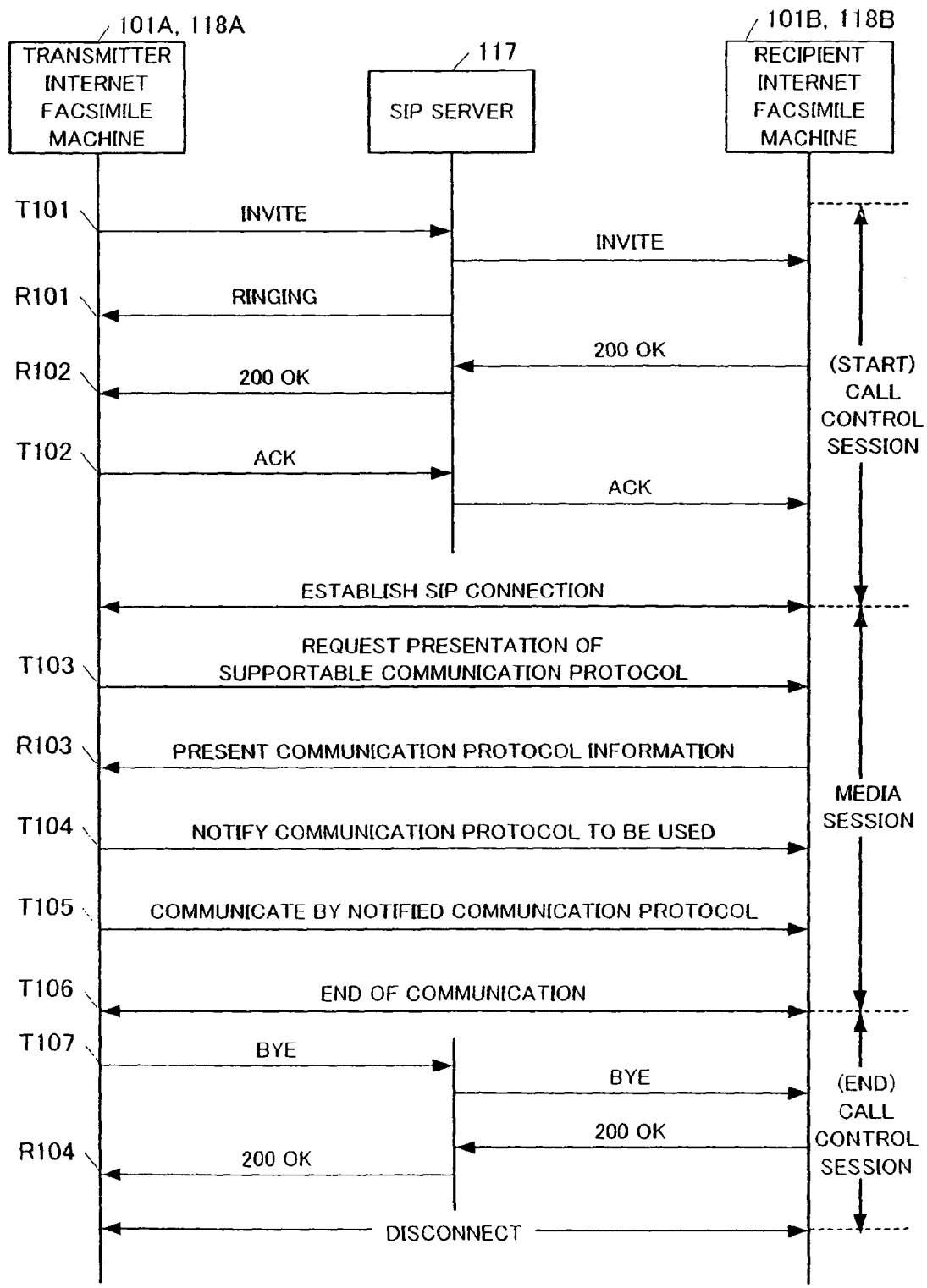
FIG. 7 is a sequence diagram showing an example of a session formed by the SIP (call control protocol) in the Internet facsimile machine (communication terminal device) according to the second and the third embodiments of the present invention.
Figure 8:
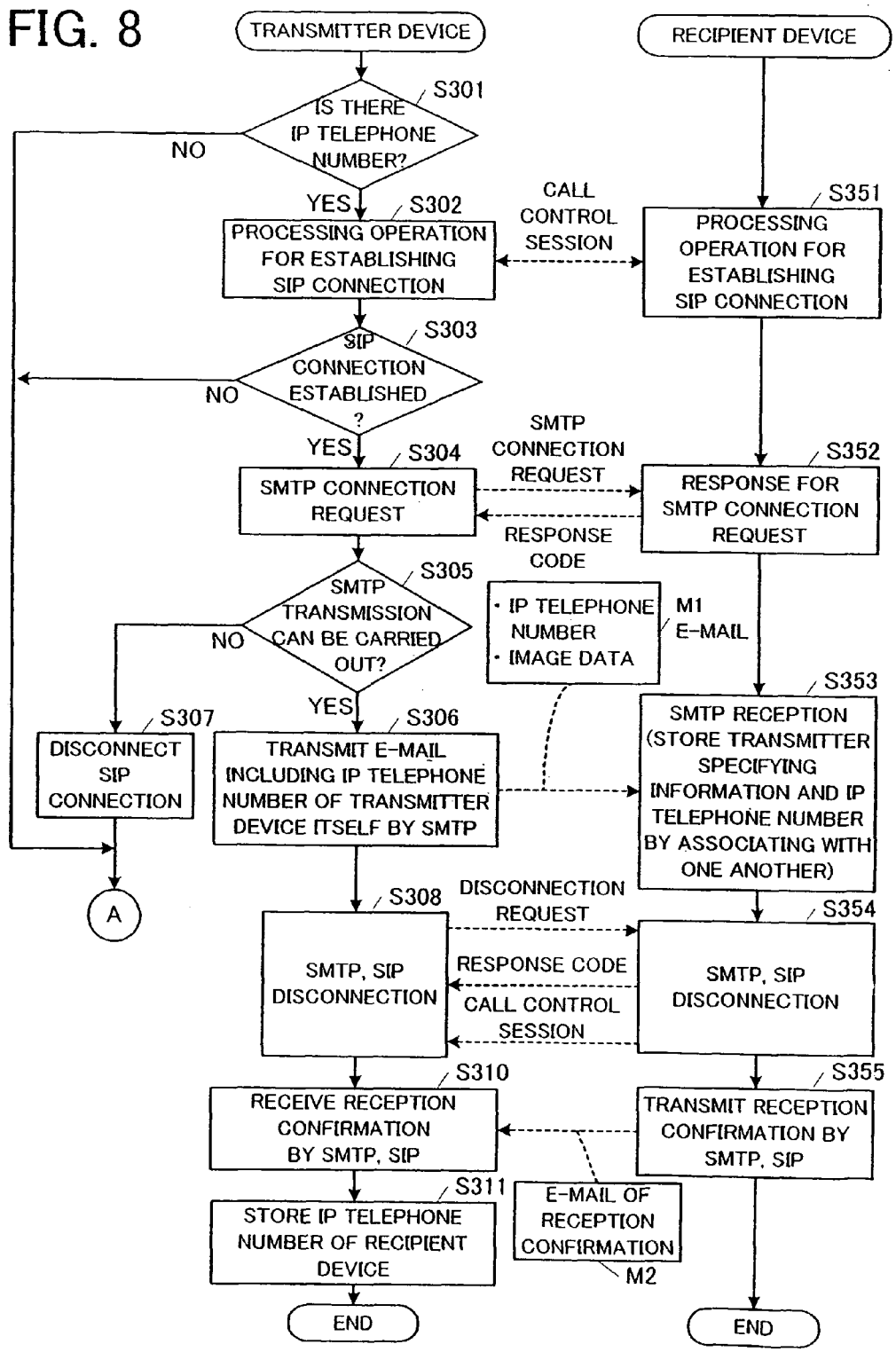
FIG. 8 is a flowchart showing a processing operation executed when transmitting an electronic mail by the Internet facsimile machine (communication terminal device) according to the second embodiment of the present invention.
Figure 9:
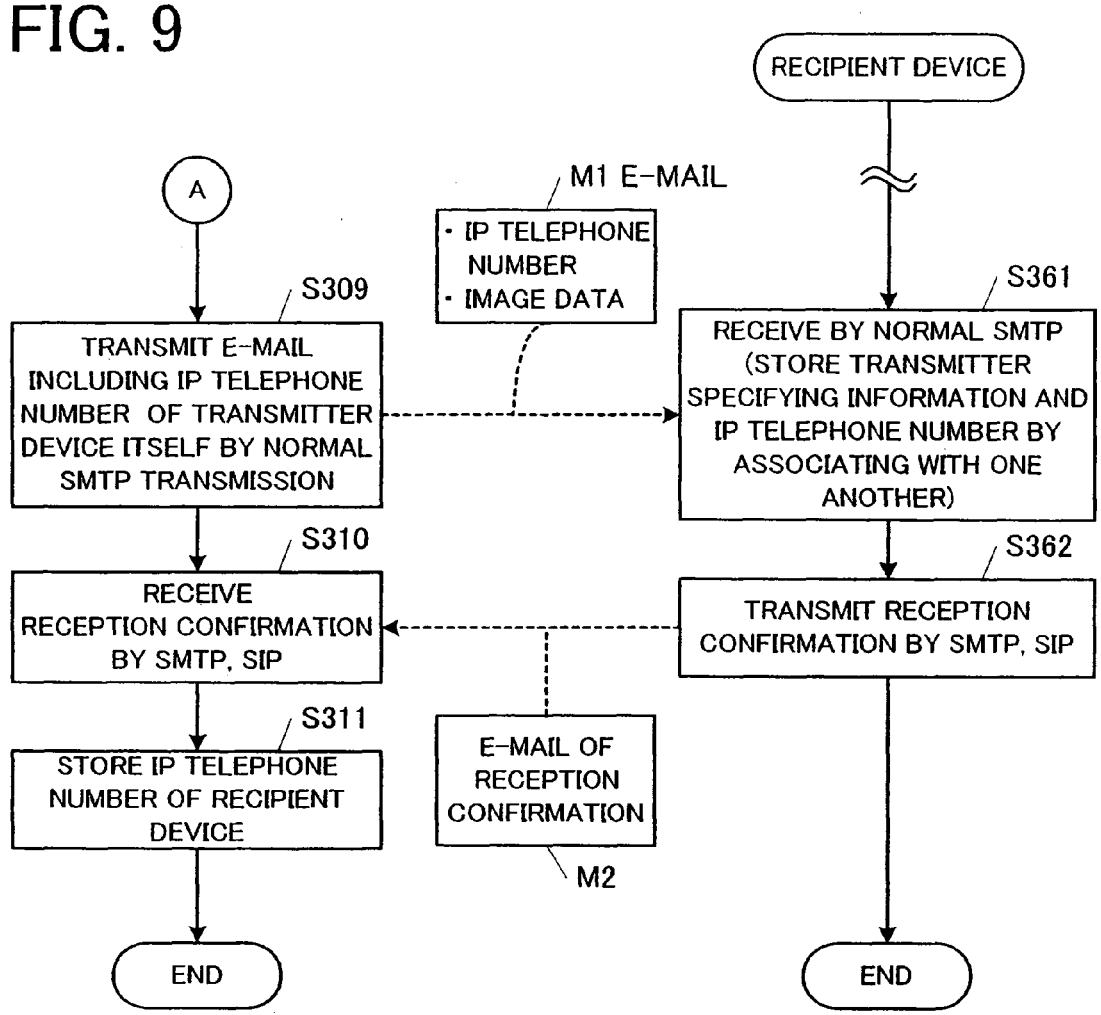
FIG. 9 is a flowchart showing a processing operation executed when transmitting electronic mail by the Internet facsimile machine (communication terminal device) according to the second embodiment of the present invention.
Figure 10:
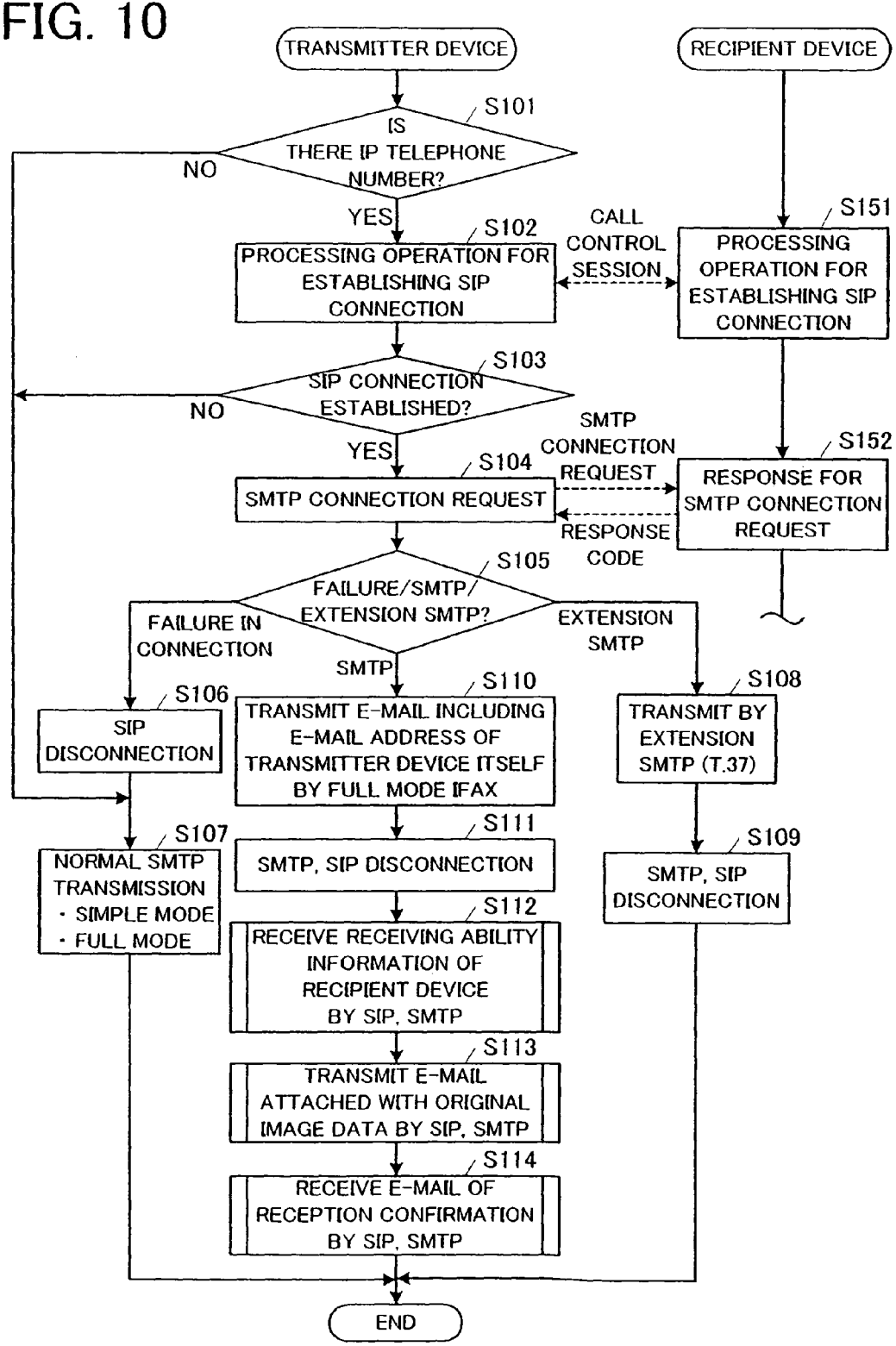
FIG. 10 is a flowchart showing a processing operation executed when transmitting electronic mail by the Internet facsimile machine (communication terminal device) according to the third embodiment of the present invention.

FIG. 7 is a sequence diagram of a session formed when transmitting electronic mail by using the SIP from the transmitter Internet facsimile machine 101A to the recipient Internet facsimile machine 101B, which will be a destination device 115. The transmitter Internet facsimile machine 101A designates by the IP telephone number, the recipient Internet facsimile machine 101B having the same configuration and including the USP/IP, the SIP, the SMTP or the like. In response to this, the recipient Internet facsimile machine 101B forms a call control session with the transmitter Internet facsimile machine 101A, which is a transmitter device that calls the recipient Internet facsimile machine 101B. Then, an SIP connection is established, and a media session is formed on the SIP connection. After the media session ends, the call control session is formed again to disconnect the communication.

Next, each session will be described. When an IP telephone number is input from the operation unit 109 by the operator at the Internet facsimile machine 101 and a prescribed transmission operation is carried out, the transmitter Internet facsimile machine 101A requests the SIP server 117 to make a call to a destination by "INVITE" that designates the IP telephone number of the recipient Internet facsimile machine (destination device) 101B (T101). The SIP server 117 that received the request requests the IP address of the IP telephone number designated by the transmitter Internet facsimile machine 101A to a location server (not shown) having information for associating the IP telephone number with the IP address. The SIP server 117 obtains the IP address, and makes a call by transmitting "INVITE" to the destination device 115 designated by the obtained IP address. At this time, a signal which indicates that the recipient Internet facsimile machine 101B is being called, "RINGING", is transmitted from the SIP server 117 to the transmitter Internet facsimile machine 101A (R101).

When the recipient Internet facsimile machine 101B called by the SIP server 117 responds to the call, the recipient Internet facsimile machine 101B transmits a success response code "200 OK" for the "INVITE" to the SIP server 117. The SIP server 117 that received the success response code "200 OK" transmits the success response code "200 OK" to the transmitter Internet facsimile machine 101A (R102). Next, the transmitter Internet facsimile machine 101A transmits to the SIP server 117, "ACK" indicating the reception of the success response code (T102). Then, the SIP server 117 that received "ACK" also transmits "ACK" to the recipient Internet facsimile machine 101B. Next, an SIP connection is established between the transmitter Internet facsimile machine 101A and the recipient Internet facsimile machine 101B to form a communication status which enables various communication protocols.

Various media sessions can be formed by both of the devices on the established SIP connection. For example, as shown in the drawing, before executing the communication protocol (communication protocol such as SMTP or HTTP) between the devices, the transmitter Internet facsimile machine 101A transmits a prescribed command to request presentation of the communication protocol which can be supported by the recipient Internet facsimile machine 101B (T103). In response to this, the recipient Internet facsimile machine 101B executes a processing operation to present the transmitter Internet facsimile machine 101A with information regarding the communication protocol which can be supported by the recipient Internet facsimile machine 101B (R103). Moreover, before starting the communication protocol, the transmitter Internet facsimile machine 101A notifies the recipient Internet facsimile machine 101B in advance with the communication protocol to be used (T104). After promoting the recipient Internet facsimile machine 101B to be prepared for the reception, the notified communication protocol is started, and an electronic mail, a Hyper Text Markup Language (HTML) file or the like is transmitted by the SMTP, the HTTP or the like on the established SIP connection (T105).

After ending the communication protocol (T106), the transmitter Internet facsimile machine 101A transmits to the SIP server 117 "BYE" to request the disconnection of the SIP connection (T107). The SIP server 117 that received "BYE" transmits "BYE" to the recipient Internet facsimile machine 101B. Then, when the SIP server 117 receives the success response code "200 OK" from the recipient Internet facsimile machine 101B, the SIP server 117 also transmits the success response code "200 OK" to the transmitter Internet facsimile machine 101A (R104), and the series of the session is ended (communication is disconnected).

The transmitter Internet facsimile machine 101A, which carries out transmission and reception of data by establishing the call control session and the media session, determines whether or not a call control connection (SIP connection) has been established, and decides which subsequent processing is to be executed in accordance with the determination result. With reference to the flowcharts of FIGS. 8 and 9, the communication processing operations to be executed by the transmitter Internet facsimile machine 101A and the recipient Internet facsimile machine 101B will be described in detail. Further, the operations of the Internet facsimile machines 101A and 101B to be described with reference to the flowcharts are respectively carried out by following a command generated by the CPU 102 in accordance with the control program stored in the ROM 104.

An operator of the transmitter Internet facsimile machine 101A provides the scanning unit 106 with an original document to be transmitted. An electronic mail address or an IP telephone number of the destination device is designated from the operation unit 109, or the electronic mail address or the IP telephone number is designated by a speed-dial number. Then, when a start key of the operation unit 109 is pressed, the transmitter Internet facsimile machine 101A determines whether or not the transmitter Internet facsimile machine 101A has the IP telephone number of the destination of the original document (S301). In particular, when an IP telephone number is input and designated, since the IP telephone number is stored in a prescribed area of the RAM 103 until the transmission process is executed, it is determined that the transmitter Internet facsimile machine 101A has the IP telephone number. When the destination is designated by the electronic mail address or the speed-dial number, if an IP telephone number is associated with the designated speed-dial number or the electronic mail address and stored in the table Ta2, it is determined that the transmitter Internet facsimile machine 101A has the IP telephone number.

When it is determined that the transmitter Internet facsimile machine 101A has the IP telephone number of the destination device, a processing operation for establishing an SIP connection with the destination device, in other words, the call control session (hereinafter referred to as the "start call control session") is executed (S302: T101, T102, etc.). Meanwhile, in response to the processing operation of the transmitter Internet facsimile machine 101A, the recipient Internet facsimile machine 101B executes a processing operation for forming a call control session (S351: R102), and an SIP connection is established between the Internet facsimile machines 101A and 101B by the SIP server 117.

When a call control session is formed for establishing an SIP connection and the call control session is executed until "ACK" is transmitted, the transmitter Internet facsimile machine 101A determines that an SIP connection has been established (S303: YES), and requests an SMTP connection to the destination device by transmitting an SMTP command "HELO" through the established SIP connection (S304). Meanwhile, when receiving the SMTP connection request, the recipient Internet facsimile machine 101B returns an SMTP response code "250" to the SMTP connection request of the transmitter Internet facsimile machine 101A (S352).

When the transmitter Internet facsimile machine 101A receives the SMTP response code "250" from the recipient Internet facsimile machine 101B, it is determined that an SMTP transmission to the destination device 101B can be carried out, and when the transmitter Internet facsimile machine 101A does not receive the SMTP response code, it is determined that the SMTP transmission to the destination device 101B cannot be carried out (S305). When it is determined that an SMTP transmission to the destination device 101B can be carried out, an electronic mail M1 is formed and transmitted to the recipient Internet facsimile machine 101B by the SMTP (S306). Further, the electronic mail M1 is attached with image data of an original document, and the IP telephone number of the transmitter Internet facsimile machine 101A is described in a prescribed area of the electronic mail (for example, "From:" section in a header part) under a prescribed format (for example, "From: IPTELNUM-050999999"). When it is determined that the SMTP transmission to the destination device 101B cannot be carried out, a call control session for disconnecting the SIP connection (T710-R104, hereinafter referred to as the "end call control session") is formed between the Internet facsimile machines 101A and 101B, and the SIP connection is disconnected (S307).

Meanwhile, the recipient Internet facsimile machine 101B receives the electronic mail M1 transmitted in S306 by the SMTP from the transmitter Internet facsimile machine 101A. The recipient Internet facsimile machine 101B extracts the IP telephone number described in the prescribed area of the electronic mail M1 under the prescribed format, and registers the extracted IP telephone number in the "IP TEL NO." column of the table Ta2 of the Internet facsimile machine 101B by associating with transmitter specifying information that specifies the transmitter of the Internet facsimile communication. In addition, the electronic mail address of the transmitter Internet facsimile machine 101A is registered (stored) in the "E-MAIL ADDRESS" column by being associated with the IP telephone number of the Internet facsimile machine 101A. Here, an electronic mail address designated in an SMTP command "MAIL FROM:" or an electronic mail address designated in "From:" section of the header part of the electronic mail, which is obtained at the reception of the electronic mail M1, is stored as the electronic mail address of the transmitter Internet facsimile machine 101A (S353).

Next, the transmitter Internet facsimile machine 101A transmits an SMTP command "QUIT" as an SMTP disconnection request, and when the recipient Internet facsimile machine 101B transmits the response code "221", the SMTP session is ended. Subsequently, the Internet facsimile machines 101A and 101B form the end call control session to disconnect the SIP connection (S308, S354).

Meanwhile, when it is determined that the transmitter Internet facsimile machine 101A does not have the IP telephone number of the destination device in S301 (S301: NO), or when it is determined that the SIP connection failed to be established in S303 (S303: NO), or when the disconnection process of the SIP connection in S307 is executed, electronic mail M1 is formed. Further, in the electronic mail M1, the IP telephone number of the Internet facsimile machine 101A is described under a prescribed format (for example, "From: IPTELNUM-050999999") in a prescribed area (for example, "From:" section in the header part) of the electronic mail. The formed electronic mail M1 is transmitted by the normal SMTP to the electronic mail address of the destination device stored in the "E-MAIL ADDRESS" column of the table Ta2 by being associated with the IP telephone number of the destination device called in S301 (to an electronic mail address of the destination device designated as the destination by the operator when it is determined that the Internet facsimile machine 101A does not have the IP telephone number of the destination device in S301) (S309). Further, a number input from the operation unit 309 by the transmission operation of the operator can be adopted as the IP telephone number of the called destination device.

The recipient Internet facsimile machine 101B receives the electronic mail M1 transmitted in S309 from the transmitter Internet facsimile machine 101A by the normal SMTP, and extracts the IP telephone number described under a prescribed format in a prescribed area of the electronic mail M1. The extracted IP telephone number is associated with the transmitter specifying information for specifying a transmitter device of the Internet facsimile communication, and registered into the "IP TEL NO." column of the table Ta2 of the Internet facsimile machine 101B. In addition, the electronic mail address of the transmitter Internet facsimile machine 101A is also registered (stored) into the "E-MAIL ADDRESS" column by being associated with the IP telephone number of the Internet facsimile machine 101A. Here, the electronic mail address of the transmitter Internet facsimile machine 101A is an electronic mail address designated by the SMTP command "MAIL FROM:" obtained at the reception of the electronic mail M1, or an electronic mail address designated in the "From:" section of the header part of the electronic mail (S361).

After executing the process of S354 or S361, the recipient Internet facsimile machine 101B forms electronic mail M2 in which the IP telephone number of the Internet facsimile machine 101B is described under a prescribed format in a prescribed area of the electronic mail. Then, the IP telephone number of the transmitter Internet facsimile machine 101A, which is stored in the table Ta2 by being associated with the transmitter specifying information, is designated, and a start call control session is formed with the transmitter Internet facsimile machine 101A. Then, an SIP connection is established, and the SMTP is executed on the SIP connection. Subsequently, the formed electronic mail M2 is transmitted by the SMTP as an electronic mail of a reception confirmation (DSN or MDN) for the electronic mail M1. Then, the end call control session is formed, and the SIP connection is disconnected (S310, S355 (or S362)).

The transmitter Internet facsimile machine 101A, which received the electronic mail M2, extracts the IP telephone number of the recipient Internet facsimile machine 101B described under a prescribed format in a prescribed area of the electronic mail M2. The extracted IP telephone number is registered (stored) in the "IP TEL NO." column by being associated with the electronic mail address of the recipient Internet facsimile machine 101B stored in the "E-MAIL ADDRESS" column of the table Ta2 of the Internet facsimile machine 101A (S311).

As described above, according to the Internet facsimile machines 101A and 101B, even when the transmitter Internet facsimile machine 101A is not aware of the IP telephone number of the recipient Internet facsimile machine 101B, in case the electronic mail address is known or in case the electronic mail address of the recipient Internet facsimile machine 101B is input and designated by the operator, if electronic mail is transmitted once, electronic mail can be transmitted automatically by the IP telephone number the next time.

Third Embodiment

Next, an Internet facsimile machine 118 according to a third embodiment of the present invention will be described.

The Internet facsimile machine 118 of the third embodiment includes the same configuration and the communication function as those of the Internet facsimile machine 101 of the second embodiment. However, the Internet facsimile machine 118 differs mainly in the processing operation executed after the SIP connection is established. In addition, the Internet facsimile machine 118 includes a so-called full mode Internet facsimile communication function in which a transmitting side obtains a transmission result, receiving ability information of a receiving side or the like by using the DSN (RFC 1891, etc.) or MDN (RFC 2298, etc.) The third embodiment will be described in detail with reference to the flowcharts of FIGS. 10 through 12. Further, a transmitter device 118 will be referred to as the transmitter Internet facsimile machine 118A, a recipient device 118 which can support an extension SMTP of the ITU-T Recommendation T.37 will be referred to as the first recipient Internet facsimile machine 118B, and a recipient device 118 which cannot support the extension SMTP but can support the SMTP will be referred to as the second recipient Internet facsimile machine 118C.

An original document to be transmitted is processed at the scanning unit 106 by an operator of the transmitter Internet facsimile machine 118A. An electronic mail address or an IP telephone number of the destination device is designated from the operation unit 109, or the electronic mail address or the IP telephone number is designated by the speed-dial number. Then, when a start key of the operation unit 109 is pressed, it is determined whether or not the transmitter Internet facsimile machine 118A has the IP telephone number of the destination of the original document (S101). The determination process of S101 is the same as the determination process carried out in S301 by the Internet facsimile machine 101A of the second embodiment.

When it is determined that the transmitter Internet facsimile machine 118A has the IP telephone number of the destination device, the IP telephone number of the destination device is designated, and a start call control session is formed between the transmitter Internet facsimile machine 118A and the destination device (S102, S151). At this time, when the start call control session is executed until "ACK" is transmitted, the transmitter Internet facsimile machine 118A determines that an SIP connection has been established (S103: YES).

Next, to confirm whether or not the destination device can support the extension SMTP (whether or not the destination device is the first recipient Internet facsimile machine 118B), the transmitter Internet facsimile machine 118A transmits through the established SIP connection, a prescribed SMTP command (for example, "EHLO") as an SMTP connection request (S104). In response to this, when the destination device is the first recipient Internet facsimile machine 118B, the first recipient Internet facsimile machine 118B returns a response code "250", which indicates that the extension SMTP can be supported, as a response to the prescribed SMTP command (S152).

Then, when the transmitter Internet facsimile machine 118A receives the response code "250" from the first recipient Internet facsimile machine 118B, it is determined that the destination device is a device which can support the extension SMTP (S105: extension SMTP).

When a response other than the response code "250" is returned from the destination, in other words, when the destination device is not the first recipient Internet facsimile machine 118B, the transmitter Internet facsimile machine 118A transmits the SMTP command "HELO" as the SMTP connection request (S104). On the contrary, when the destination device is a device which can support the SMTP (when the destination device is the second recipient Internet facsimile machine 118C), a response code "250" is returned as the response to the SMTP connection request to the transmitter Internet facsimile machine 118A (S152).

Then, when the transmitter Internet facsimile machine 118A receives the response code "250" from the second recipient Internet facsimile machine 118c, it is determined that the destination device is a device which can support the SMTP (S105: SMTP).

Meanwhile, when there is no return of the response code "250", the transmitter Internet facsimile machine 118A determines that the destination device cannot support the SMTP on the SIP connection, in other words, determines that the SMTP connection failed on the SIP connection (S105: failure in connection). Then, the established SIP connection is disconnected by forming the end call control session with the destination device (S106). When it is determined in S101 that the transmitter Internet facsimile machine 118A does not have the IP telephone number of the destination device (S101: NO), or when it is determined that the SIP connection failed to be established in S103 (S103: NO), or when the SIP connection is disconnected in S106, the electronic mail to be delivered to the destination device is transmitted by a full mode Internet facsimile communication under the normal SMTP to the electronic mail address stored by being associated with the IP telephone number of the destination device registered in the table Ta2 (IP telephone number called in S101) (to the electronic mail address of the destination device designated as the destination by the operator when it is determined in S101 that the transmitter Internet facsimile machine 118A does not have the IP telephone number of the destination device) (S107). Further, when the destination device does not support the full mode Internet facsimile communication, in other words, when the MDN or the like is not returned or when the receiving ability information or the like of the destination is not described in the returned MDN, the electronic mail is transmitted under a simple mode.

Figure 11:
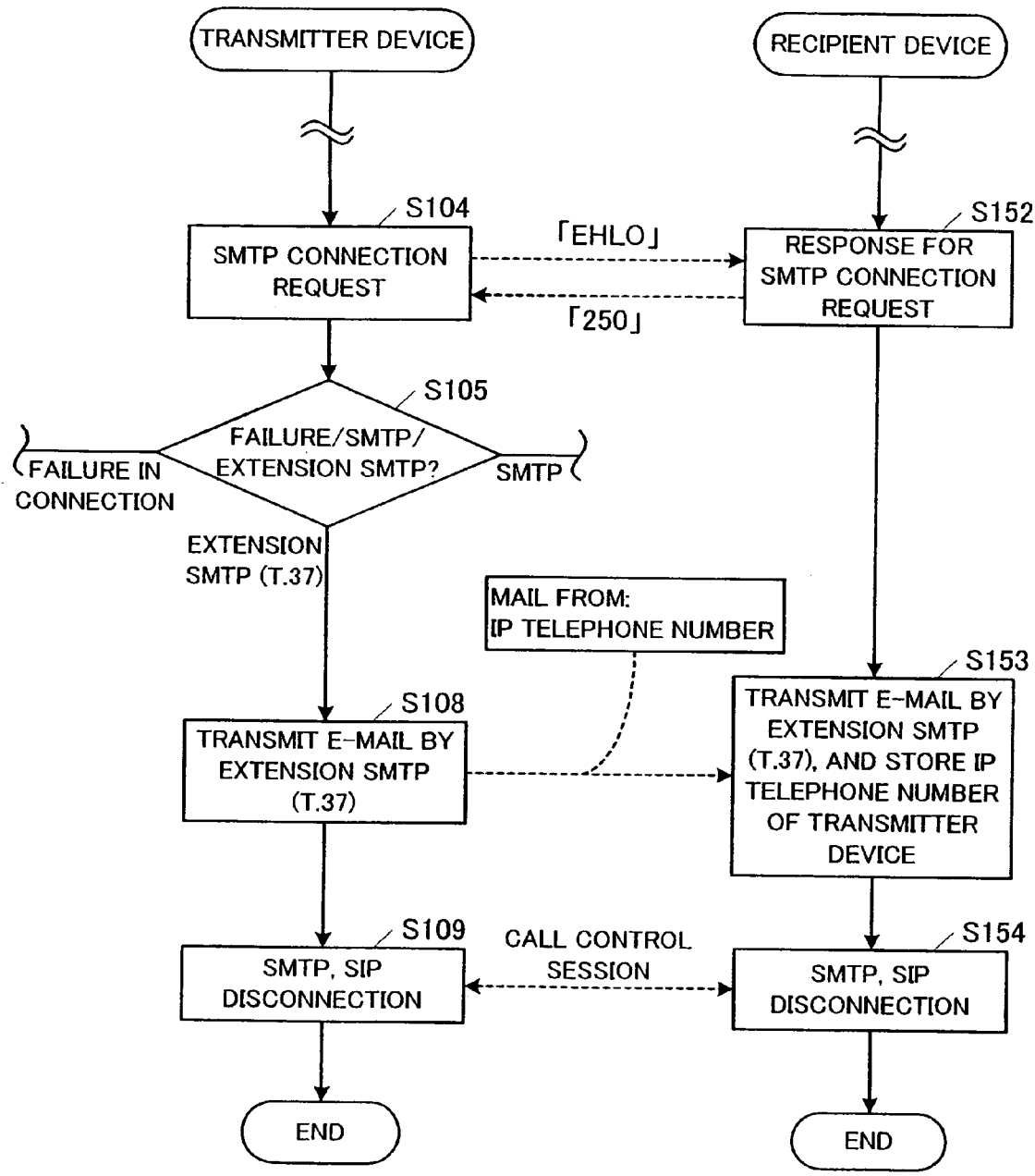
FIG. 11 is a flowchart showing a processing operation executed when transmitting electronic mail by the Internet facsimile machine (communication terminal device) according to the third embodiment of the present invention, and a flowchart when a receiving device is a first recipient Internet facsimile machine.

Next, the processing operations to be executed by the Internet facsimile machines 118A and 118B when the transmitter Internet facsimile machine 118A determines in S105 that the destination device is the first recipient Internet facsimile machine 118B (which can support the extension SMTP) will be described. As shown in the flowchart of FIG. 11, the transmitter Internet facsimile machine 118A includes the IP telephone number of the Internet facsimile machine 118A in the SMTP command "MAIL FROM:" in the SMTP session formed with the first recipient Internet facsimile machine 118B (S108). Meanwhile, the recipient Internet facsimile machine 118B associates the IP telephone number of the transmitter Internet facsimile machine 118A described in "MAIL FROM:" with the electronic mail address of the Internet facsimile machine 118A obtained from the "from:" section or the like of the electronic mail header, and registers (stores) into the table Ta2 (S153). Then, an end call control session is formed between the Internet facsimile machines 118A and 118B, and the SIP connection is disconnected (S109, S154).

Figure 12:
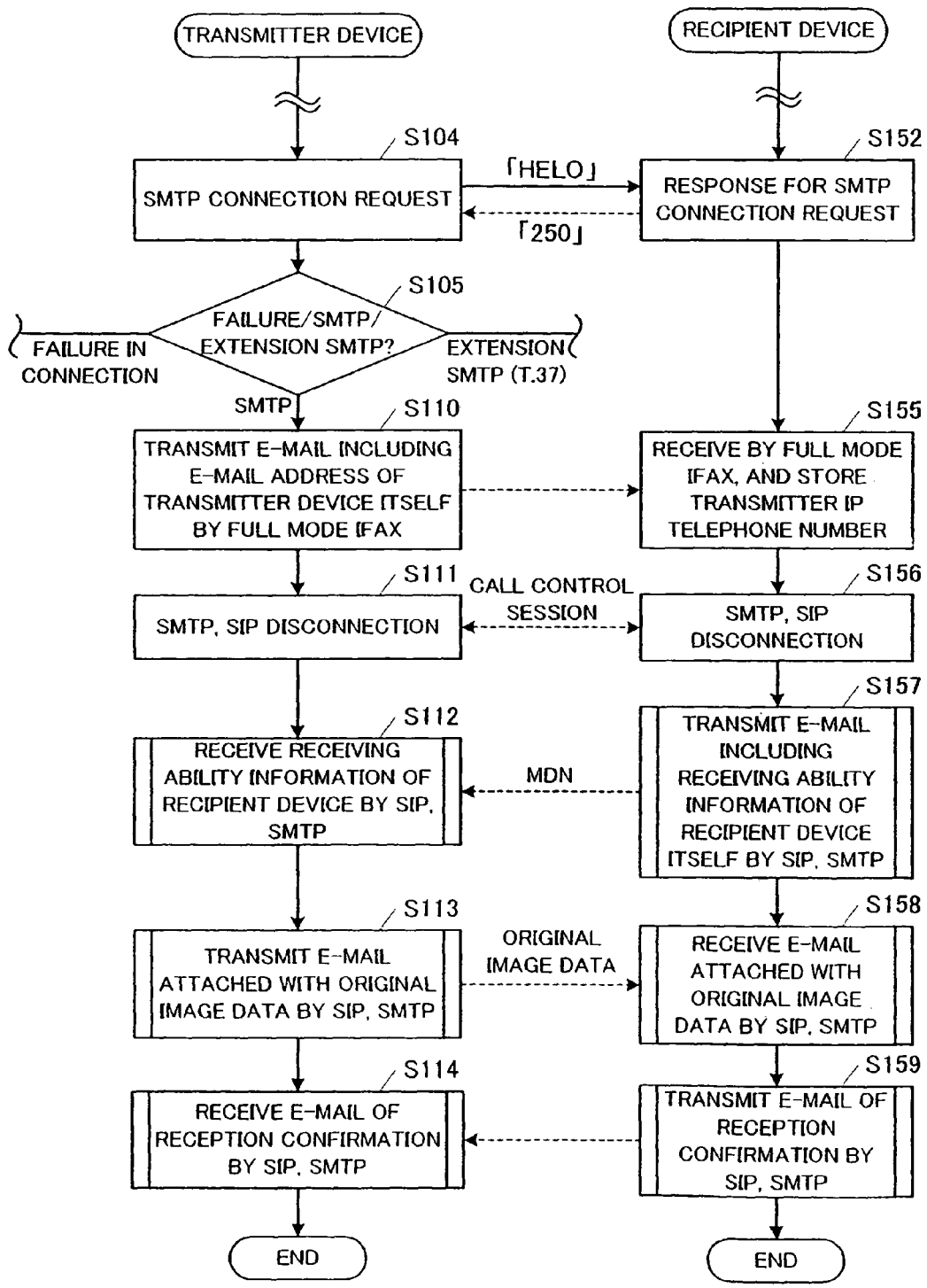
FIG. 12 is a flowchart showing a processing operation executed when transmitting electronic mail by the Internet facsimile machine (communication terminal device) according to the third embodiment of the present invention, and a flowchart when a receiving device is a second recipient Internet facsimile machine.

Next, the processing operations to be executed by the Internet facsimile machine 118A and 11C when the transmitter Internet facsimile machine 118A determines in S105 that the destination device is the second recipient Internet facsimile machine 118C (which can support the SMTP) will be described. As shown in the flowchart of FIG. 12, when the second recipient Internet facsimile machine 118C returns the response code "250" as a response to the SMTP command "HELO" transmitted from the transmitter Internet facsimile machine 118A as the processing operation of S104 (S152), a series of processing steps to be described below is executed between the Internet facsimile machines 118A and 118C for exchanging electronic mail.

That is, the transmitter Internet facsimile machine 118A forms electronic mail M3 in which the IP telephone number of the Internet facsimile machine 118A itself is described under a prescribed format in a prescribed area of the electronic mail. Then, the transmitter Internet facsimile machine 118A transmits the electronic mail M3 to the second recipient Internet facsimile machine 118C. In response to this, the second recipient Internet facsimile machine 118C extracts the IP telephone number described under the prescribed format in the prescribed area of the electronic mail M3, and registers (stores) the extracted IP telephone number into the "IP TEL NO." column of the table Ta2 of the Internet facsimile machine 118C by associating with the transmitter specifying information of the electronic mail M3. Moreover, the electronic mail address of the transmitter Internet facsimile machine 118A, which is the transmitter device, is also stored into the "E-MAIL ADDRESS" column of the table Ta2 by being associating with the transmitter specifying information of the electronic mail M3. Further, an electronic mail address designated in the SMTP command "MAIL FROM:" obtained at the reception of the electronic mail M3 or an electronic mail address designated in the "From:" section of the header part of the electronic mail is stored as the electronic mail address of the transmitter Internet facsimile machine 118A (S110, S155). The Internet facsimile machines 118A and 118C form an end call control session, and disconnects the SMTP and the SIP connection (S111, S156).

Figure 13:
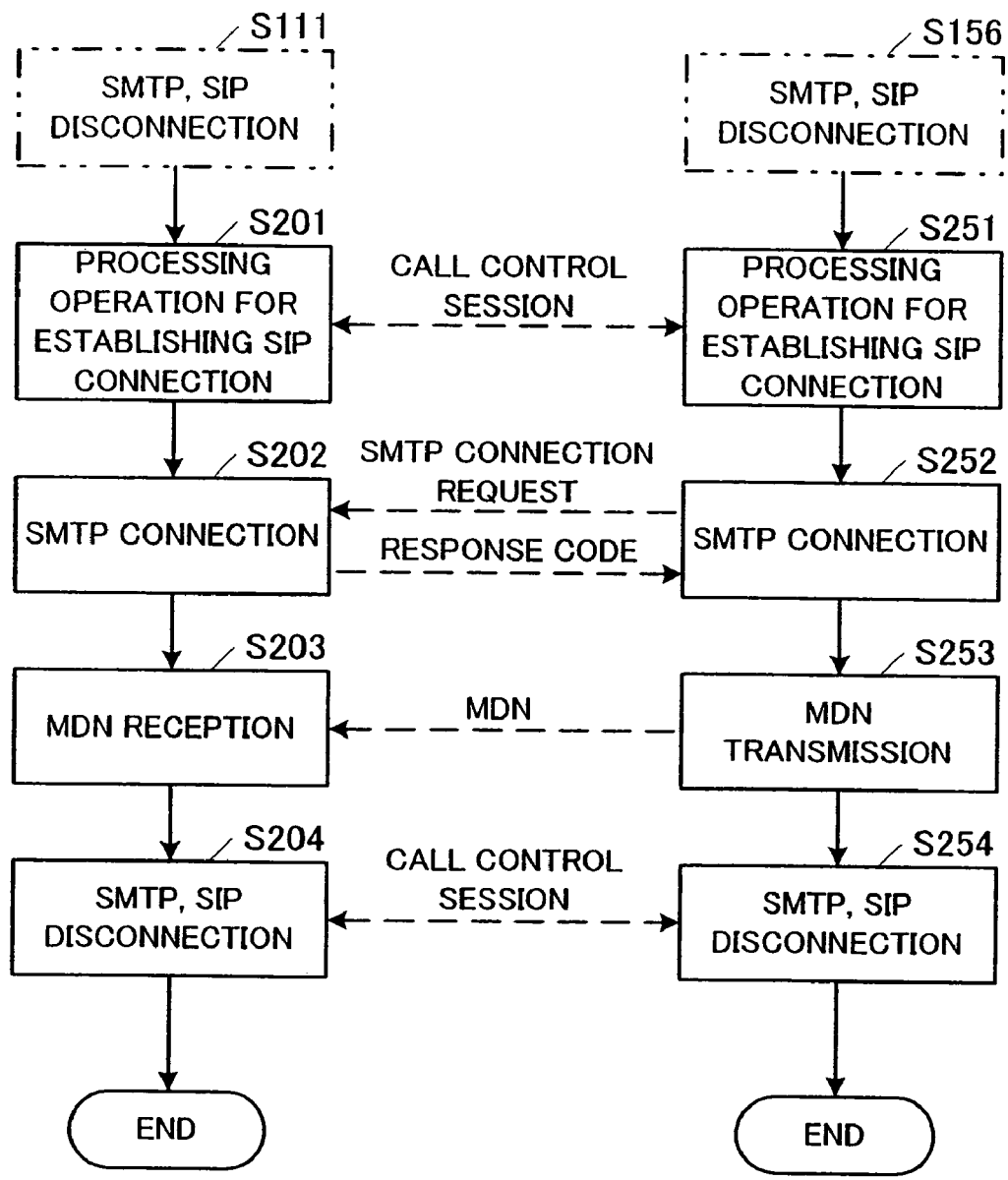
FIG. 13 is a detailed flowchart of FIG. 12.

Next, the second recipient Internet facsimile machine 118C becomes a transmitting side and the transmitter Internet facsimile machine 118A becomes a receiving side, and a start call control session is formed between the Internet facsimile machines 118C and 118A to transmit an MDN through the SIP connection (S112, S157). FIG. 13 shows the details of the processing operations carried out by the Internet facsimile machines 118A and 118C. That is, the second recipient Internet facsimile machine 118C designates the IP telephone number of the transmitter Internet facsimile machine 118A (IP telephone number registered in the table Ta2 by being associated with the transmitter specifying information) to make a call, and a start call control session is formed between the Internet facsimile machines 118A and 118C (S201, S251). The second recipient Internet facsimile machine 118C requests an SMTP connection to the transmitter Internet facsimile machine 118A, and an SMTP session is started (S202, S252). In the SMTP session, the second recipient Internet facsimile machine 118C transmits to the transmitter Internet facsimile machine 118A, electronic mail (MND) including the receiving ability or the like of the Internet facsimile machine 118C itself (S253). The transmitter Internet facsimile machine 118A receives the electronic mail (MND) (S203). At last, the Internet facsimile machines 118A and 118C form an end call control session, and disconnect the SMTP and the SIP connection (S204, S254).

Next, the transmitter Internet facsimile machine 118A forms image data in a format according to the receiving ability information of the destination from the stored original image data (image data in a format scanned by the maximum scanning ability of the Internet facsimile machine 118A itself), and forms electronic mail attached with the image data. Then, the transmitter Internet facsimile machine 118A executes the processing operations of S102 and S104, and the second recipient Internet facsimile machine 118C executes the processing operations of S151 and S152 to establish an SIP connection. Then, an SMTP session is started, and the formed electronic mail is transmitted. The Internet facsimile machines 118A and 118C form an end call control session, and disconnect the SMTP and the SIP connection (S113, S158).

At last, the transmitter Internet facsimile machine 118A and the second recipient Internet facsimile machine 118C reciprocally execute the processing operations that are the same as the processing operations of S201, S202, S251 and S252 to establish an SIP connection and to start an SMTP session. Then, the second recipient Internet facsimile machine 118C transmits electronic mail for a reception confirmation. When the transmitter Internet facsimile machine 118A receives the electronic mail for the reception confirmation, the Internet facsimile machines 118A and 118C form an end call control session, and disconnect the SMTP and the SIP connection to end the series of operation (S114, S159).

Fourth Embodiment

Figure 14:
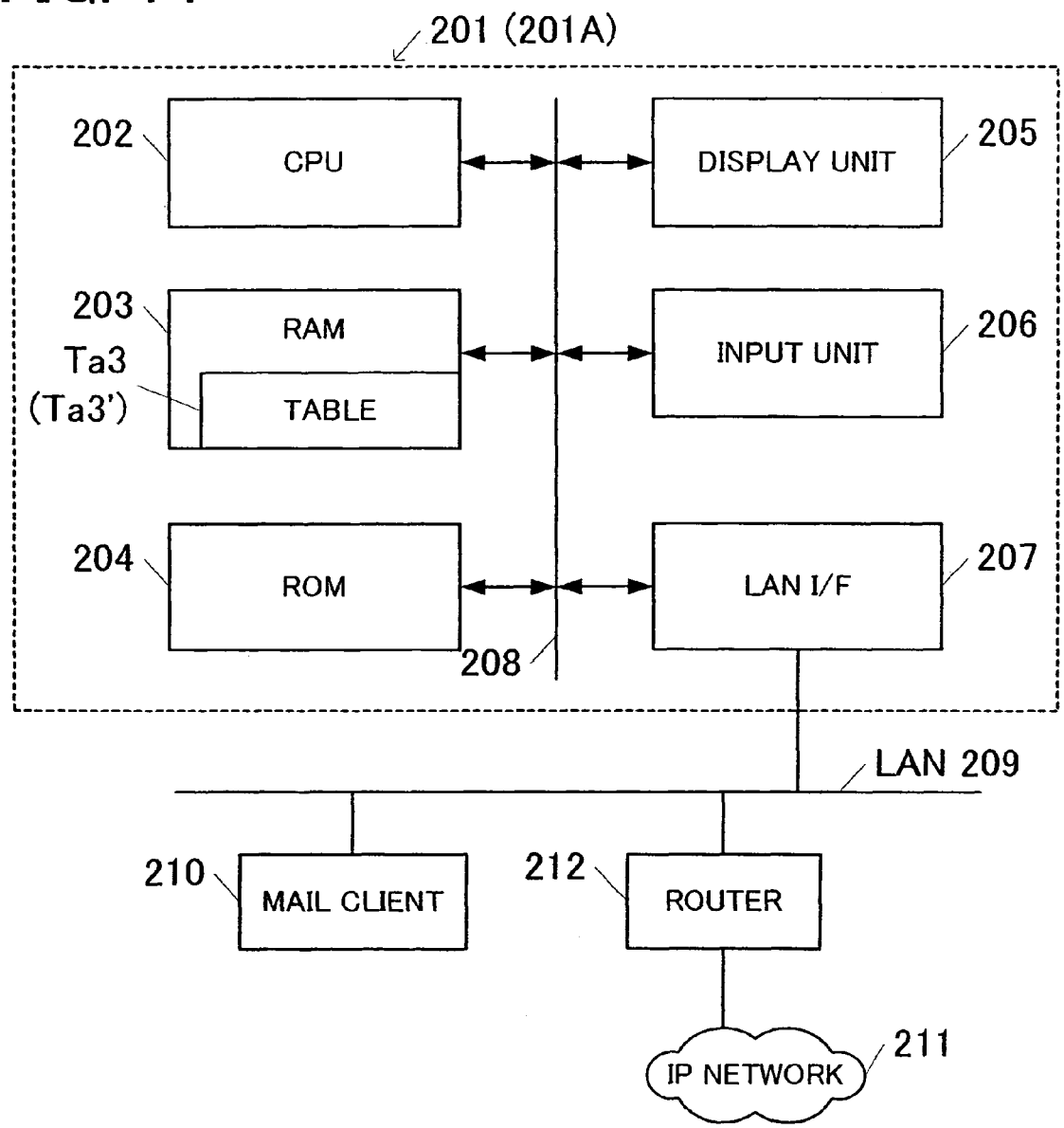
FIG. 14 is a block diagram showing an example of a configuration of an electronic mail server according to a fourth embodiment of the present invention.

An electronic mail server according to the fourth embodiment will be described with reference to the drawings as an example of an electronic mail server to achieve the third object of the present invention. FIG. 14 shows an example of a configuration of an electronic mail server. That is, the electronic mail server 201 includes a CPU 202, a RAM 203, a ROM 204, a display unit 205, an input unit 206, and a LAN interface 207. Each of the parts 202 through 207 is connected by a bus 208 in a manner that communication can be carried out.

The CPU 202 controls each of the parts of the electronic mail server 201 in accordance with a prescribed program. The RAM 203 functions as a storage unit which stores various pieces of configuration information, a table Ta3 to be described later, systematic information or the like, and as a storage unit for various data stored temporarily. The ROM 204 stores various programs for the CPU 202 to control the operation of each of the parts of the electronic mail server 201. The display unit 205 displays information regarding the status of the electronic mail server 201, various screens, the contents of the table Ta3 or the like. The input unit 206 is formed from a keyboard, a mouse or the like. The input unit 206 is used for configuring and inputting various pieces of information by an operator, and also used for editing the contents of the tables Ta3 and Ta3'.

The LAN interface 207 is an interface for a LAN 209, and connects the electronic mail server 201 to the LAN 209 in a manner that communication can be carried out. A mail client 210 and a router 212 are also connected to the LAN 209. The mail client 210 is formed from a personal computer or the like embedded with a mailer (software for a client to transmit and receive electronic mail). The router 212 connects the LAN 209 and an IP network 211.

The table Ta3 formed in the RAM 203 can be edited freely by an operation of an operator from the input unit 206. As shown in FIG. 15A, the table Ta3 includes a "DESTINATION ADDRESS, DOMAIN" column for registering an electronic mail address or a domain name, and an "IP TEL NO." column for registering an IP telephone number. In addition, the information registered in the columns are associated with one another and stored by being provided in the same record. For example, an electronic mail address "abc@efg.com" registered in the "DESTINATION ADDRESS, DOMAIN" column and an IP telephone number "050-1234-5678" registered in the "IP TEL NO." column are associated with one another and stored in the table Ta3.

Moreover, systematic information (not shown) of an IP network telephone number (IP telephone number) is stored in a prescribed area of the RAM 203. When a telephone number starting with "050-" or "080-" is assigned as the IP network telephone number in a telephone number system of a telephone company or an intranet, "050-" or "080-" is registered as the systematic information of the IP network telephone number in a prescribed area of the RAM 203 by an input operation of an operator or the like.

Figure 16A:
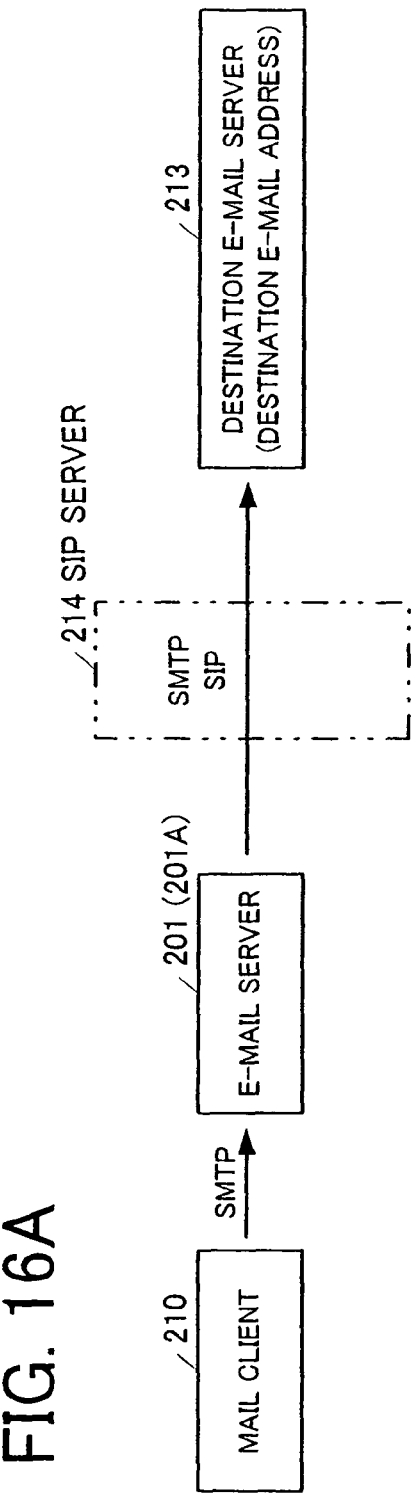
Figure 16A:
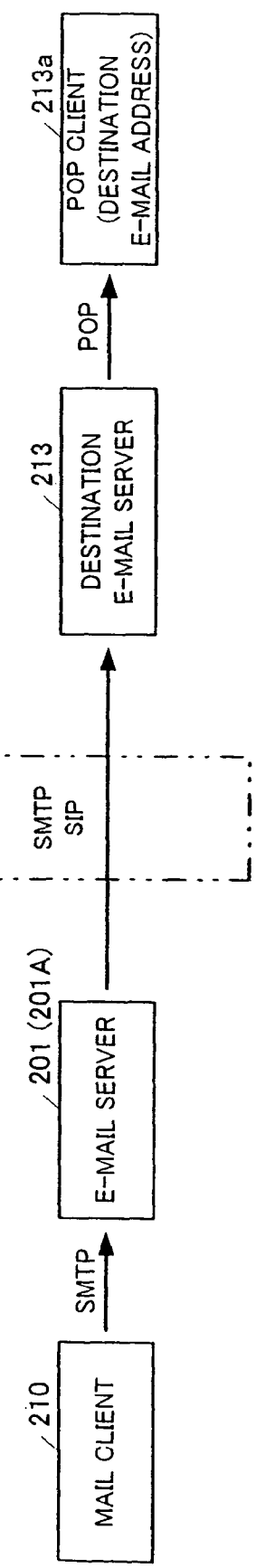

The electronic mail server 201 stores in its mailbox, electronic mail addressed to the domain name of the electronic mail server 201 itself. The electronic mail server 201 also includes an SMTP server function for forwarding electronic mail addressed to another domain name, and also the UDP/IP and the SIP. As shown in FIGS. 16A and 16B, by using these communication functions, the electronic mail server 201 designates a destination device (destination electronic mail server) 213, which also has the UDP/IP, the SIP and the SMTP, by the IP telephone number. Then, by establishing an SIP connection, the electronic mail server 201 executes an SMTP communication directly with the destination electronic mail server 213, and transmits directly to the destination electronic mail server 213, the electronic mail received from the mail client 210 or the like. Further, FIG. 16A shows a case in which the destination electronic mail address is an electronic mail address of the destination electronic mail server 213, and FIG. 16B shows a case in which the destination electronic mail address is an electronic mail address of a Post Office Protocol (POP) client 213a of the destination electronic mail server 213.

Figure 17:
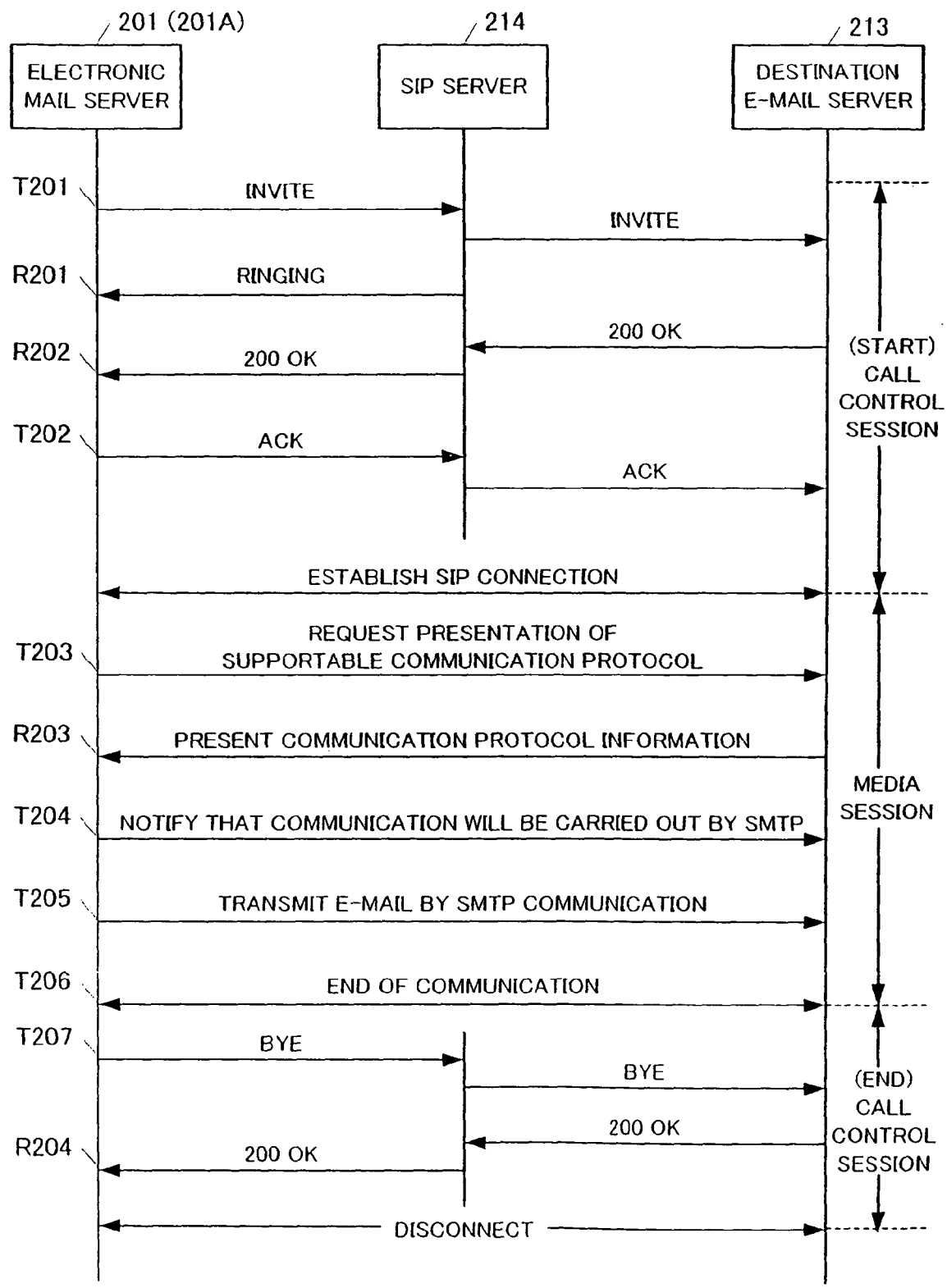
FIG. 17 is a sequence diagram showing an example of a session when carrying out communication with a destination electronic mail server by the SIP (call control protocol).

To transmit the electronic mail directly to the destination electronic mail server 213 in real-time, as shown in FIG. 17, the electronic mail server 201 designates the destination electronic mail server 213 by an IP telephone number, forms a call control session, and establishes an SIP connection. Then, after forming a media session on the established SIP connection, a call control session is formed to disconnect the communication.

Specifically, when the electronic mail received from the mail client 210 or the like is electronic mail to be forwarded (when the domain name of the destination electronic mail address designated by the SMTP command "RCPT TO:" at the reception differs from the domain name of the electronic mail server 201 itself), the electronic mail server 201 requests the SIP server 214 to make a call to a destination by "INVITE" that designates the IP telephone number (T201). The SIP server 214 that received the request inquires an IP address of the IP telephone number designated by the electronic mail server 201 to a location server (not shown) having information for associating the IP telephone number and the IP address. The SIP server 214 obtains the IP address, and makes a call by transmitting "INVITE" to the destination electronic mail server 213 designated by the IP address. At this time, a signal which indicates that the destination electronic mail server 213 is being called, "RINGING", is transmitted from the SIP server 214 to the electronic mail server 201 (R201).

When the destination electronic mail server 213 called by the SIP server 214 responds to the call, the destination electronic mail server 213 transmits a success response code "200 OK" to the SIP server 214, and the SIP server 214 also transmits the success response code "200 OK" to the electronic mail server 201 (R202). Then, the electronic mail server 201 transmits to the SIP server 214, "ACK" indicating a reception of the success response code (T202). The SIP server 214 also transmits "ACK" to the destination electronic mail server 213, and an SIP connection is established between the electronic mail server 201 and the destination electronic mail server 213 to form a communication status enabling an SMTP communication. Further, the call control session formed until the SIP connection is established will be referred to as the "start call control session".

Before executing an SMTP communication with the destination electronic mail server 213 on the established SIP connection, the electronic mail server 201 transmits to the destination electronic mail server 213, a prescribed command for requesting a presentation of a communication protocol which can be supported by the destination electronic mail server 213 (T203). In response to this, the destination electronic mail server 213 executes a processing operation for presenting to the electronic mail server 201, information relating to the communication protocol which can be supported by the electronic mail server 213 itself (R203). Moreover, before executing a communication protocol, the electronic mail server 201 notifies to the destination electronic mail server 213 in advance with a communication protocol to be used, in other words, a fact that an SMTP communication will be carried out (T204). After promoting the destination electronic mail server 213 to be prepared for the reception, an SMTP communication is executed with the destination electronic mail server 213, and electronic mail is transmitted (forwarded) (T205).

After completing the SMTP communication (media session) (T206), the electronic mail server 201 transmits to the SIP server 214, "BYE" which requests to disconnect the SIP connection (T207). The SIP server 214 that received "BYE" transmits "BYE" to the destination electronic mail server 213. Then, when the SIP server 214 receives a success response code "200 OK" from the destination electronic mail server 213, the success response code "200 OK" is also transmitted to the electronic mail server 201 (R204), and a series of session ends (communication is disconnected). Further, the call control session formed after the end of the media session and until the communication is disconnected will be referred to as the "end call control session".

Figure 18:
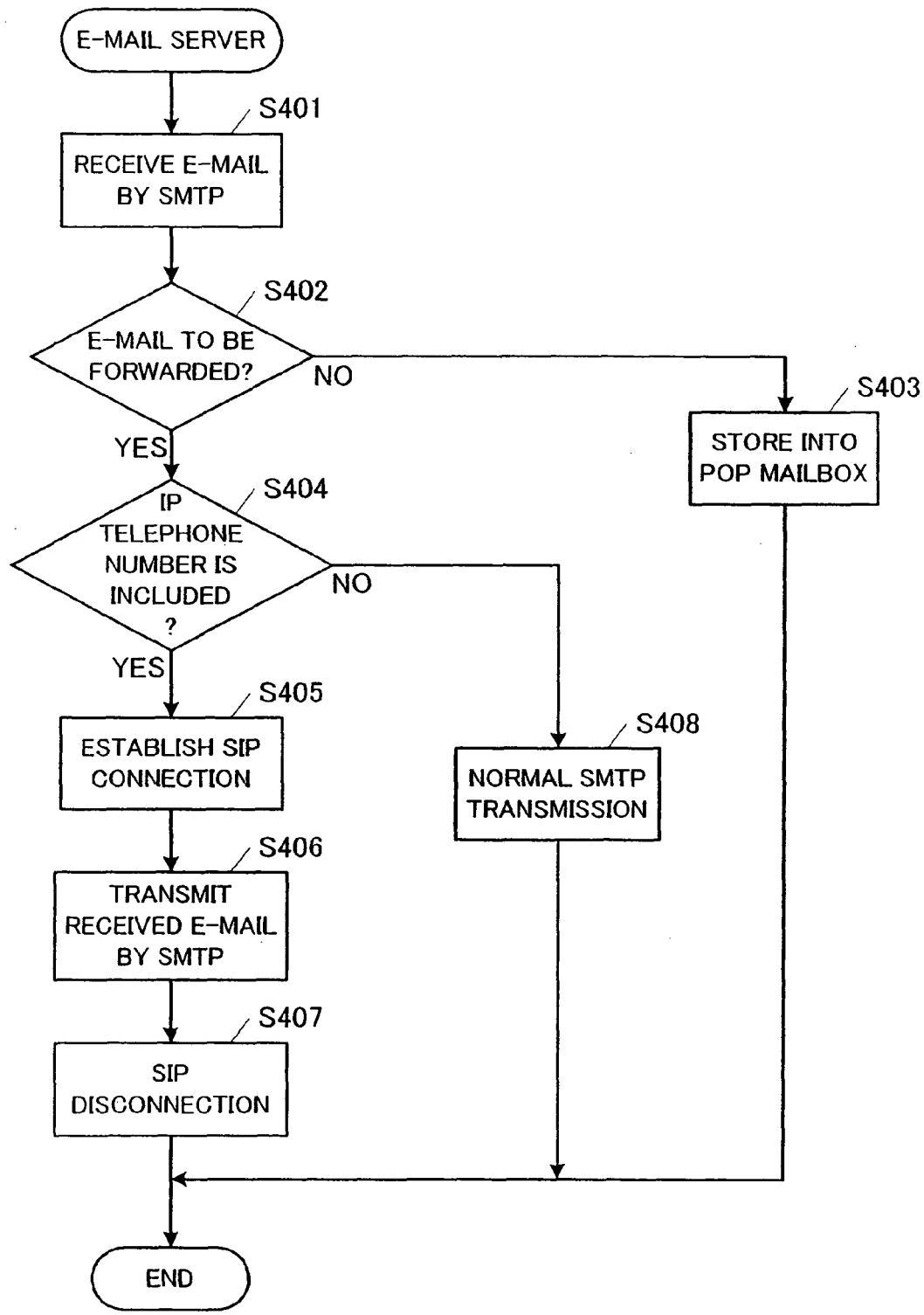
FIG. 18 is a flowchart showing a processing operation executed when the electronic mail server receives electronic mail according to the fourth embodiment of the present invention.
Figure 19:
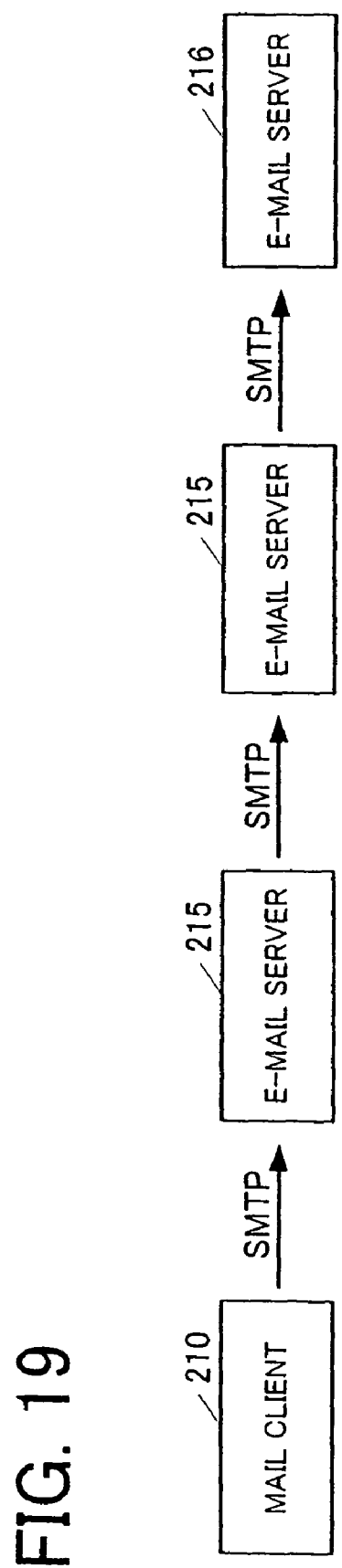
FIG. 19 shows a transmission channel of electronic mail forwarded by a conventional electronic mail server.

Next, referring to the flowchart shown in FIG. 18, an operation when the electronic mail server 201 receives an electronic mail from the mail client 210 or another electronic mail server will be described. Further, the operation of the electronic mail server 201 to be described in accordance with the flowchart is carried out by following the command generated by the CPU 202 in accordance with the control program stored in the ROM 204.

When the electronic mail server 201 receives electronic mail by the SMTP (S401), if the destination electronic mail address designated in the SMTP command "RCPT TO:" or the like does not include the domain name of the electronic mail server 201, it is determined that the electronic mail is electronic mail to be forwarded (S402: YES). Meanwhile, when the domain name of the electronic mail server 201 itself in included, it is determined that the electronic mail is address to the electronic mail server 201 (S402: NO), and the received electronic mail is stored into a POP mailbox in the electronic mail server 201 (For example, the POP mailbox is formed in a prescribed area of the RAM 203) (S403).

When the received electronic mail is electronic mail to be forwarded (S402: YES), it is determined whether or not the electronic mail server 201 has an IP telephone number of the destination electronic mail server 213 that corresponds to the destination electronic mail address of the received electronic mail (S404).

To carry out the determination process of S404, it is determined whether or not a number, which has the systematic information of the IP network telephone number such as "050-" or "080-" at the head of the number, is described in a header part, in a main text, or to a front or back of a bound symbol "@" of the destination electronic mail address designated by the SMTP command "RCPT TO:" or the like of the received electronic mail. For example, when the destination electronic mail address is "050-0000-9999", it is determined that the systematic information "050-" is included. Then, the systematic information and a number of prescribed digits, for example, the number "0000-9999" subsequent to the systematic information, are extracted as the IP telephone number of the destination electronic mail server 213. In addition, it is determined that the electronic mail server 201 itself has the IP telephone number of the destination electronic mail server 213. Meanwhile, when a number, which has the systematic information of the IP network telephone number at the head part of the number, is not described in front or back of the bound symbol "@", it is determined further whether or not the destination electronic mail address of the received electronic mail corresponds with either one of the electronic mail addresses registered in the "DESTINATION ADDRESS, DOMAIN" column of the table Ta3. When the electronic mail address corresponds, the telephone number associated with the electronic mail address is applied as an IP telephone number of the destination electronic mail server 213, and it is determined that the electronic mail server 201 itself has the IP telephone number of the destination electronic mail server 213.

Next, when it is determined that the electronic mail server 201 itself has the IP telephone number of the destination electronic mail server 213 that corresponds to the destination electronic mail address (S404: YES), the IP telephone number is designated, and the start call control session is formed to establish an SIP connection with the destination electronic mail server 213 (S405). Then, the processes of T203, R203, and T204 are carried out to exchange data on the established SIP connection, and the SMTP communication protocol is executed to transmit the received electronic mail to the destination electronic mail server 213 (S406). At last, the end call control session is formed, and the SIP connection is disconnected (S407).

Meanwhile, when it is determined in S404 that the electronic mail server 201 itself does not have the IP telephone number of the destination electronic mail server 213 that corresponds to the destination electronic mail address of the received electronic mail (S404: NO), the received electronic mail is transmitted by the normal SMTP electronic mail transmission. In other words, without establishing an SIP connection, the electronic mail is transmitted to the destination electronic mail address via an electronic mail forwarding process between each of the SMTP servers (S408).

As described above, according to the electronic mail server of the fourth embodiment of the present invention, when the destination electronic mail server 213 of the destination electronic mail address, which is the final destination, can support the SIP, and the electronic mail server 201 has the IP telephone number of the destination electronic mail server 213, the electronic mail can be transmitted directly in real-time. Therefore, there is an advantage that a transmission result can be obtained at the same time as the transmission of the electronic mail.

Moreover, when transmitting electronic mail by using the electronic mail server 201, by describing an IP telephone number in a prescribed area of the electronic mail to be transmitted, the electronic mail can be forwarded by the electronic mail server 201 by using the SIP. Therefore, the transmitter can select whether to forward the electronic mail by using the SIP or to forward the electronic mail by the normal SMTP.

Next, another example of the fourth embodiment will be described. In the determination process of S404, the electronic mail server 201A of this example decides the IP telephone number of the destination electronic mail server 213 to be designated in S405 in accordance with specific information when the specific information is included in the SMTP command "RCPT TO:", which is the communication information of the electronic mail, or in a header part or a main text of the electronic mail, which is the electronic mail information.

Therefore, the table Ta3' having specific information as shown in FIG. 15B is stored in a prescribed area of the RAM 203 of the mail server 201A. The table Ta3' can be edited freely by an operation of an operator from the input unit 206, and includes "SPECIFIC INFORMATION" column for registering specific information, and an "IP TEL NO." column for registering an IP telephone number. The information registered in the columns are associated with one another by being provided in the same record, and stored. For example, the specific information "KYOTOBRANCHOFFICE" registered in the "SPECIFIC INFORMATION" column and the IP telephone number "050-1234-5678" registered in the "IP TEL NO." column are associated with one another and stored in the table Ta3'.

Then, in the determination process of S404, the electronic mail server 201A searches whether either one of the specific information registered in the "SPECIFIC INFORMATION" column of the table Ta3' is described in the SMTP command "RCPT TO:" or the header part or the main text of the electronic mail. When specific information is described, the telephone number stored by being associated with the specific information is extracted as the IP telephone number of the destination electronic mail server 213. Accordingly, it is determined that the electronic mail server 201A itself has the IP telephone number of the destination electronic mail server that corresponds to the destination electronic mail address (S404: YES), and a series of processing operation for S405 and after are executed.

On the other hand, when the specific information registered in the "SPECIFIC INFORMATION" column of the table Ta3' is not described in any one of the SMTP command "RCPT TO:" or the header part or the main text of the electronic mail, it is determined that the electronic mail server 201A itself does not have the IP telephone number of the destination electronic mail server 213 (S404: NO), and the processing operation of S408 is executed.

According to the electronic mail server 201A of the above-described second example of the fourth embodiment, the specific information to be described in the electronic mail or the like is the information registered in the "SPECIFIC INFORMATION" column of the table Ta3'. As a result, without being effected by a description format of the telephone number, the electronic mail address or the like, various types of symbols and character information can be used. For example, if "KYOTOBRANCHOFFICE" is registered as the specific information in the table Ta3', and the IP telephone number of the mail server of a Kyoto Branch Office is registered by being associated with "KYTOBRANCHOFFICE", a name which can easily recall the destination can be described as the specific information to be described in the electronic mail at the receiving side of the electronic mail, and convenience improves.

Further, in the above-described fourth embodiment, the SIP is used as the call control protocol, but of course, protocols other than SIP that are similar to the SIP can be used for the call control protocol.

What is claimed is:

1. A communication terminal device comprising:
   means for establishing a connection by a call control protocol with a destination device designated by an Internet Protocol (IP) telephone number;
   means for determining whether or not the connection has been established;
   means for transmitting electronic mail in real-time and directly to the destination device over the connection when the connection is established;
   means for transmitting the electronic mail to a mail server when the means for determining determines that the connection failed to be established; and
   means for storing an IP telephone number and an electronic mail address by associating with one another;
   wherein a prescribed electronic mail address is the electronic mail address stored by the means for storing by being associated with the IP telephone number of the destination device.

2. The communication terminal device according to claim 1, further comprising:
   means for transmitting an IP telephone number of the communication terminal device by including in a transmission process of the electronic mail.

3. A communication method comprising the steps of:
   establishing a connection by a call control protocol with a destination device designated by an Internet Protocol (IP) telephone number;
   determining whether or not a connection has been established in the step of establishing;
   requesting a presentation of a plurality of communication protocols which the destination device can support over the connection when it has been determined that the connection is established in the step of determining;
   selecting one communication protocol which the communication terminal device can support from communication protocols presented from the destination device as a response to the request;
   transmitting electronic mail in real-time and directly to the destination device over the established connection by selected communication protocol; and
   transmitting electronic mail to a mail server when it is determined in the step of determining that a the connection failed to be established.

4. A communication terminal device comprising:
   means for establishing a first connection by a call control protocol with a transmitter device that called the communication terminal device by an Internet Protocol (IP) telephone number;
   means for receiving a first electronic mail transmitted in real-time and directly from the transmitter device over the first connection;
   means for extracting an IP telephone number from the first electronic mail; and
   means for storing the extracted IP telephone number.

5. The communication terminal device according to claim 4, further comprising:
   means for extracting an IP telephone number from the first electronic mail;
   means for establishing a second connection with the transmitter device designated by the extracted IP telephone number; and
   means for transmitting a second electronic mail of a reception confirmation for the first electronic mail received over the second connection in real-time and directly.

6. A communication method comprising the steps of:
   establishing a first connection by a call control protocol with a transmitter device that called a communication terminal device;
   receiving a first electronic mail transmitted in real-time and directly from the transmitter device over the first connection;
   extracting an Internet Protocol (IP) telephone number from the first electronic mail received in the step of receiving;
   establishing a second connection by the call control protocol with the transmitter device that the communication terminal device calls by the extracted IP telephone number; and
   transmitting to the transmitter device over the second connection, a second electronic mail of a reception confirmation for the first electronic mail in real-time and directly.

7. An electronic mail server comprising:
   means for establishing a connection by a call control protocol with a destination device designated by an Internet Protocol (IP) telephone number;
   means for transmitting electronic mail in real-time and directly over the connection and designating a destination device by the IP telephone number when receiving electronic mail to be forwarded;
   means for determining whether or not the connection has been established; and
   means for transmitting the electronic mail to a destination mail server when the means for determining determines that the connection fails to be established.

8. The electronic mail server according to claim 7, wherein the IP telephone number is included in the received electronic mail.

9. The electronic mail server according to claim 7, further comprising:
   means for receiving the electronic mail from a mail client with a specific information included in communication information of the received electronic mail or electronic mail information;
   means for storing a specific information and in IP telephone number by associating with one another as a table; and
   means for deciding the IP telephone number corresponding the specific information with the table.

10. A communication method comprising the steps of:
    receiving an electronic mail from a mail client including with a specific information included in communication information of the received electronic mail or electronic mail information;
    deciding an Internet Protocol (IP) telephone number corresponding the specific information;
    establishing a connection by a call control protocol by designating a destination device by the Internet Protocol (IP) telephone number; and
    transmitting the received electronic mail received in real-time and directly over the established connection.

* * * * *